(12) United States Patent
Jutte et al.

(10) Patent No.: US 11,187,643 B2
(45) Date of Patent: *Nov. 30, 2021

(54) LASER SENSOR MODULE FOR PARTICLE DENSITY DETECTION

(71) Applicant: TRUMPF Photonic Components GmbH, Ulm (DE)

(72) Inventors: Petrus Theodorus Jutte, Eindhoven (NL); Johannes Hendrikus Maria Spruit, Eindhoven (NL); Alexander Marc Van der Lee, Eindhoven (NL); Joachim Wilhelm Hellmig, Eindhoven (NL); Roy Ovink, Eindhoven (NL); Ralph Engelbertus Theodorus Gudde, Eindhoven (NL)

(73) Assignee: TRUMPF PHOTONIC COMPONENTS GMBH, Ulm (DE)

( * ) Notice: Subject to any disclaimer, the term of this patent is extended or adjusted under 35 U.S.C. 154(b) by 267 days.

This patent is subject to a terminal disclaimer.

(21) Appl. No.: 16/434,206

(22) Filed: Jun. 7, 2019

(65) Prior Publication Data
US 2019/0346360 A1 Nov. 14, 2019

Related U.S. Application Data

(63) Continuation of application No. PCT/EP2017/081090, filed on Dec. 1, 2017.

(30) Foreign Application Priority Data

Dec. 9, 2016 (EP) .................................. 16203068

(51) Int. Cl.
*G01N 15/14* (2006.01)
*G01N 15/06* (2006.01)
(Continued)

(52) U.S. Cl.
CPC ..... *G01N 15/1431* (2013.01); *G01N 15/0205* (2013.01); *G01N 15/06* (2013.01);
(Continued)

(58) Field of Classification Search
CPC ............... G01N 15/0205; G01N 15/06; G01N 15/1456; G01N 15/1431;
(Continued)

(56) References Cited

U.S. PATENT DOCUMENTS 4,251,733 A 2/1981 Hirleman, Jr.
4,707,130 A * 11/1987 Hofmann ................ G01F 1/661
356/28

(Continued)

FOREIGN PATENT DOCUMENTS

CN 102356297 A 2/2012
CN 102564909 A 7/2012
(Continued)

OTHER PUBLICATIONS

Guido Giuliani, et al., "Laser diode self-mixing technique for sensing applications", J. Opt. A: Pure Appl. Opt. 4(2002), Nov. 4, 2002, pp. 283-294.

*Primary Examiner* — Sang H Nguyen
(74) *Attorney, Agent, or Firm* — Leydig, Voit & Mayer, Ltd.

(57) ABSTRACT

A laser sensor for detecting a particle density includes: a laser configured to emit a measurement beam, an optical arrangement being arranged to focus the measurement beam to a measurement volume, the optical arrangement having a numerical aperture with respect to the measurement beam, a detector configured to determine a self-mixing interference signal of a optical wave within a laser cavity of the laser, and an evaluator. The evaluator is configured to: receive detection signals generated by the detector in reaction to the
(Continued)

determined self-mixing interference signal, determine an average transition time of particles passing the measurement volume in a predetermined time period based on a duration of the self-mixing interference signals generated by the particles, determine a number of particles based on the self-mixing interference signals in the predetermined time period, and determine the particle density based on the average transition time and the number of particles.

15 Claims, 12 Drawing Sheets

(51) Int. Cl.
  *G01N 15/02* (2006.01)
  *G01N 15/00* (2006.01)
  *G01N 15/10* (2006.01)
(52) U.S. Cl.
  CPC ..... *G01N 15/1456* (2013.01); *G01N 2015/03* (2013.01); *G01N 2015/0693* (2013.01); *G01N 2015/1075* (2013.01); *G01N 2015/1087* (2013.01); *G01N 2015/1454* (2013.01); *G01N 2015/1486* (2013.01); *G01N 2015/1493* (2013.01)
(58) Field of Classification Search
  CPC ... G01N 2015/0046; G01N 2015/1075; G01N 2015/0693; G01N 2015/1454; G01N 2015/1493; G01N 2015/1087; G01N 2015/03; G01N 2015/1447; G01N 2015/1486
  See application file for complete search history.

(56) References Cited

U.S. PATENT DOCUMENTS

| | | | |
|---|---|---|---|
| 6,041,662 A * | 3/2000 | Jenni | G01S 15/58 73/861.25 |
| 6,233,045 B1 | 5/2001 | Suni et al. | |
| 9,354,315 B2 | 5/2016 | Lepaysan et al. | |
| 2008/0221812 A1* | 9/2008 | Pittaro | G01N 15/14 702/66 |
| 2009/0238423 A1 | 9/2009 | Rigler | |
| 2009/0303458 A1 | 12/2009 | Heinks et al. | |
| 2010/0328680 A1 | 12/2010 | Baier et al. | |
| 2012/0002189 A1 | 1/2012 | Bengoechea Apezteguia et al. | |
| 2012/0016615 A1 | 1/2012 | Carpaij et al. | |
| 2013/0037726 A1* | 2/2013 | Kiesel | G01N 15/1459 250/458.1 |
| 2014/0268142 A1* | 9/2014 | Tropea | G01N 15/0211 356/340 |
| 2014/0353522 A1* | 12/2014 | Wu | G01N 15/1434 250/458.1 |
| 2015/0233704 A1* | 8/2015 | Martini | G01B 11/0691 356/635 |
| 2016/0313243 A1* | 10/2016 | Dittrich | G01N 15/1434 |
| 2017/0052256 A1* | 2/2017 | Delfs | G01S 7/4817 |
| 2017/0185157 A1* | 6/2017 | Delfs | G01B 11/14 |
| 2018/0209779 A1* | 7/2018 | Van Der Lee | G01S 7/4916 |
| 2018/0224368 A1* | 8/2018 | Spruit | G01S 7/4916 |

FOREIGN PATENT DOCUMENTS

| | | |
|---|---|---|
| CN | 106066294 A | 11/2016 |
| DE | 102015207289 A1 | 10/2016 |
| EP | 2388614 A2 | 11/2011 |
| JP | 2009520203 A | 5/2009 |
| JP | 2009544024 A | 12/2009 |
| JP | 2011517362 A | 6/2011 |
| JP | 2012515894 A | 7/2012 |
| JP | 2014081330 A | 5/2014 |
| JP | 2016128795 A | 7/2016 |
| WO | WO 0237410 A1 | 5/2002 |
| WO | WO 2006067723 A1 | 6/2006 |
| WO | WO 2010106483 A2 | 9/2010 |
| WO | WO 2017198699 A1 | 11/2017 |

* cited by examiner

LASER SENSOR MODULE FOR PARTICLE DENSITY DETECTION

CROSS-REFERENCE TO PRIOR APPLICATIONS

This application is a continuation of International Patent Application No. PCT/EP2017/081090, filed on Dec. 1, 2017, which claims priority to European Patent Application No. 16203068.8, filed on Dec. 9, 2016. The entire disclosure of both applications are hereby incorporated by reference herein.

FIELD

The present invention relates to a laser sensor module for particle density detection.

BACKGROUND

DE 10 2015 207 289 A1 discloses a particle sensor apparatus having an optical emitter device that is configured to emit an optical radiation so that a volume having at least one particle possibly present therein is at least partly illuminable; an optical detector device having at least one detection surface that is struck by at least a portion of the optical radiation scattered at the at least one particle, at least one information signal regarding an intensity and/or an intensity distribution of the optical radiation striking the at least one detection surface being displayable; and an evaluation device with which an information item regarding a presence of particles, a number of particles, a particle density, and/or at least one property of particles is identifiable and displayable, the particle sensor apparatus also encompassing at least one lens element that is disposed so that the emitted optical radiation is focusable onto a focus region inside the volume. The particle sensor apparatus includes a mirror device which is arranged to move the focus region in order to suppress influence of wind speed.

WO 2017/198699 A1, a post-published application, discloses a laser sensor module including at least a first laser being adapted to emit a first measurement beam and at least a second laser being adapted to emit a second measurement beam. The laser sensor module further includes an optical device being arranged to redirect the first measurement beam and the second measurement beam. The laser sensor module includes one detector being adapted to determine at least a first self-mixing interference signal of a first optical wave within a first laser cavity of the first laser and at least a second self-mixing interference signal of a second optical wave within a second laser cavity of the second laser. This configuration shall enable determination of an average velocity of the particles despite of the fact that it may not be possible to determine the components of the velocity vector. The disclosure further describes a particle sensor including such a laser sensor module as well as a corresponding method and computer program product.

SUMMARY

An embodiment of the present invention provides a laser sensor for detecting a particle density includes: at least a first laser configured to emit a first measurement beam, an optical arrangement being arranged to focus at least the first measurement beam to a first measurement volume, the optical arrangement having a first numerical aperture with respect to the first measurement beam, at least a first detector configured to determine a first self-mixing interference signal of a first optical wave within a first laser cavity of the first laser, and an evaluator. The evaluator is configured to: receive detection signals generated by at least the first detector in reaction to the determined first self-mixing interference signal, determine an average transition time of particles passing the first measurement volume in a predetermined time period based on a duration of the first self-mixing interference signals generated by the particles, determine a number of particles based on the first self-mixing interference signals in the predetermined time period, and determine a first particle density based on the average transition time and the number of particles.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
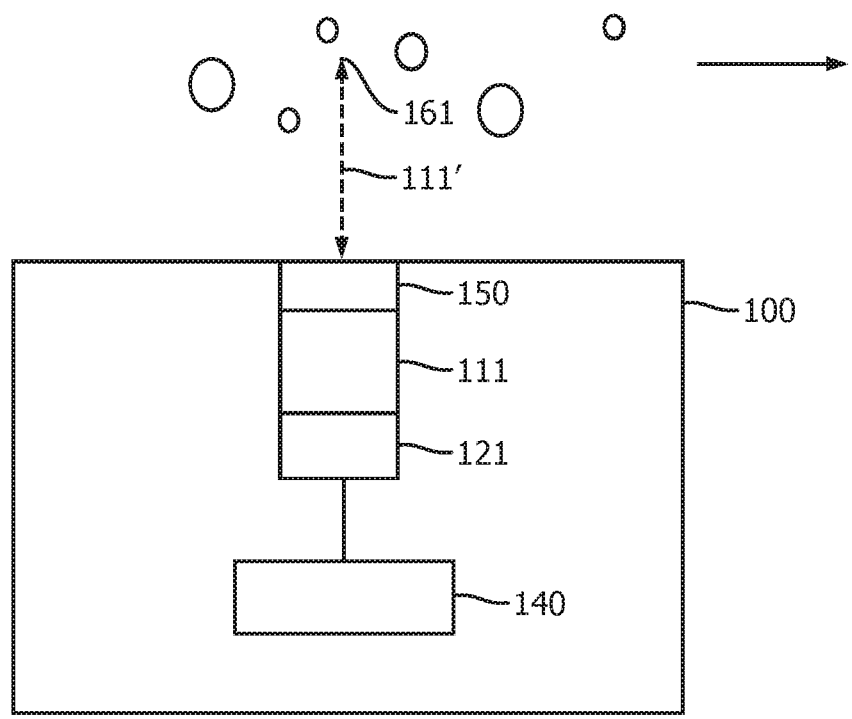
FIG. 1 shows a principal sketch of a first laser sensor module.

Embodiments of the present invention provide an improved and simplified laser sensor module for particle density detection.

According to a first aspect a laser sensor module (or laser sensor) for detecting a particle density of small particles (solid or liquid particles that can stay suspended in the air and spread with the wind). The particle size is usually smaller than 20 μm or even 10 μm. The particles may, for example, be characterized by a size between 0.05 micrometers and 10 μm, preferably between 0.1 and 2.5 μm. The laser sensor module includes:
- at least a first laser being adapted to emit a first measurement beam,
- an optical arrangement being arranged to focus at least the first measurement beam to a first measurement volume, where the optical arrangement is characterized by a first numerical aperture with respect to the first measurement beam,
- at least a first detector being adapted to determine a first interference signal or a first self-mixing interference signal of a first optical wave within a first laser cavity of the first laser,
- an evaluator, where the evaluator is adapted to receive detection signals generated by at least the first detector in reaction to the determined first interference or first self-mixing interference signal, where the evaluator is further adapted to determine an average transition time of particles passing the first measurement volume in a predetermined time period based on a duration of the first interference or the first self-mixing interference signals generated by the particles, where the evaluator is further adapted to determine a number of particles based on the first interference or the first self-mixing interference signals in the predetermined time period, and where the evaluator is further adapted to determine a first particle density based on the average transition time and the number of particles.

Optical sensing techniques for particle detection and especially for particle density detection usually use a measurement volume with a known particle flow. That means velocity as well as direction of particle flow with respect to the measurement beam is known. The particle flow may be defined by means of, for example, a fan such that the particles are moved or by means of, for example, a MEMS mirror which moves the measurement beam relative to the particles. Influence of wind speed with respect to the detected volume per observation time unit can be reduced or even be eliminated by these measures. Optical sensor modules using such techniques are bulky and may not be suited for all particle sensing applications.

The laser sensor module described above enables particle detection without providing a predefined particle flow direction and velocity. Only one laser (and corresponding detector) emitting a measurement beam only in one direction is used to generate first self-mixing interference signals based on particles passing the first measurement volume in a predetermined time period. The self-mixing interference signals are used to determine a number of particles and an average transition time of the particles passing the first measurement volume within the predetermined time period. The transition time of each single particle is a time difference between the start of the self-mixing interference signal generated by the respective particle and the end of the self-mixing interference signal generated by the respective particle. The average transition time is the average of all transition times measured within the predefined time. Certain thresholds may be defined in order to select self-mixing interference signals, which may improve determination of the average transition time. It may, for example, be possible to select only such self-mixing interference signals with a maximum signal amplitude above a predefined threshold amplitude value. The predefined threshold amplitude value may enable selection of such self-mixing interference signals caused by particles passing a center line of the measurement volume along the direction of the measurement beam. Furthermore, the essentially circular shape of the particles and the first measurement beam causes that the transition time as a function of out of center distance reduces only gradually such that transition time detection is not sensitive with respect to the path of the particle through the first measurement volume. The average transition time and the number of particles detected by means of the self-mixing interference signals are in case of an approximately known relationship between a velocity vector of the particle flow with the direction of the first measurement beam sufficient to determine the first particle density.

The self-mixing interference signals further provide information regarding a velocity component of a velocity vector of the measured particle flow parallel to the first measurement beam. This information can be used in combination with the average transition time and a reference beam diameter giving an indication of a velocity component perpendicular to the first measurement beam to determine an angle 90°-α between the velocity vector and the first measurement beam. The reference beam diameter is a calibration factor, which is determined based on reference experiments with reference angle α. The first self-mixing interference signals are further used to determine the number of particles passing the first measurement volume in the predetermined time period. A first particle density is determined based on the average transition time, the number of detected particles in the predetermined time period and the angle α. The angle α is determined by means of the formula (equation 1):

$$\alpha = \mathrm{atan}\left(f * 0.5 * \lambda * \frac{t_{meas}}{d_{ref}}\right)$$

with f=Doppler frequency, λ=measurement wavelength (e.g. 850 nm), $t_{meas}$=measured average transition time and $d_{ref}$=reference beam diameter.

The numerical aperture may be further arranged to detect a predetermined minimum particle size at a reference velocity, where the reference velocity is chosen within a predetermined velocity range including the reference velocity.

It has been recognized that the count rate remains the same and also the minimum detected particle size remains constant if the ratio between the average velocity and the third power of the numerical aperture of the optics of the sensor module is constant. This means that at a lower average particle velocity the numerical aperture of the optics to focus the measurement beams to the detection volumes should be lower. The laser sensor module or particle detection system including such a module may be designed with respect to the reference velocity. The reference velocity is a further calibration parameter, which depends on the range of particle velocities which should be covered in order to enable a reliable particle density detection by means of the laser sensor module. The reference velocity is chosen such that a given particle density can be determined in a reliable way across the predetermined velocity range.

The optical arrangement is preferably characterized by a first numerical aperture between 0.01 and 0.06, preferably between 0.02 and 0.04 with respect to the first measurement beam, where the reference velocity of the detected particles is less than 1 m/s. The predetermined velocity range may be in the range between 0.01 m/s and 7 m/s. The small numerical aperture in combination with the slow movement of the particles may enable a reliable detection of particles by means of a handheld device like, for example, a mobile communication device (e.g. smartphone). Furthermore, the small numerical aperture enables a reliable detection distance (first measurement volume) of between 3 and 10 mm to a surface of the, for example, smartphone including the laser sensor module.

Depending on the average velocity of the laser sensor module with respect to the particle flow it may be necessary to adapt the numerical aperture to the intended application. A laser sensor module which may predominantly be used on a moving object (vehicle) with an average velocity of, for example, 10 m/s needs a bigger numerical aperture in order to enable detection of smaller particles at the high velocity otherwise such small particles are not counted increasing the error of the particle density detection.

The evaluator may be further adapted to determine an angle enclosed between the first measurement beam and a velocity vector of the particles based on the first self-mixing interference signal and the average transition time. The first particle density is determined based on the number of detected particles, the angle α, the reference velocity and the average transition time perpendicular to the beam, where the reference velocity and the reference beam diameter define a reference (transition) time ($t_{ref}$) in which a reference particle with a reference particle size passes the first measurement beam, where a velocity vector of the reference particle is perpendicular to the first measurement beam.

The evaluator may further be adapted to correct the determined first particle density by a factor including the fourth root of the ratio between the average time duration and the reference time.

The factor including the fourth root of the ratio between the average time duration and the reference time is used to compensate for the time dependence of the particle counts at a given reference particle density which shows a $t^{1/4}$ dependency. Particle density detection by means of this laser sensor module with one laser is very insensitive with respect to measurement errors of the average transition time because of this $t^{1/4}$ dependency. The reference velocity is in fact chosen such that this correction factor for time ($\sim(t/t_{ref})^{1/4}$) is minimized within the predetermined velocity range. In other cases the reference velocity can also be chosen as the most likely velocity for a certain user model. The reference velocity may, for example, be adapted to the respective application. The laser sensor module or to be more precise a device including the laser sensor module may be used to determine the first particle density in a room. The average wind speed would in this case be near to or even 0 m/s. The reference velocity may in this case be chosen to be, for example, 0.05 m/s. Alternatively, the device may ask the user to provide information about the measurement conditions by means of a user interface. The user may, for example, provide information that the device including the laser sensor module is used outside the building and it is windy. The device may in this case be arranged to assign at different reference velocity in accordance with the information provided by the user. The reference velocity may, for example, be 0.9 m/s in this case.

The evaluator may be further adapted to determine a first particle count rate at a first signal to noise ratio threshold level and a second particle count rate at a second signal to noise ratio threshold level different than the first signal to noise ratio threshold level. The evaluator is further adapted to correct the determined particle density by means of the first particle count rate and the second particle count rate.

Experiments have shown that at higher velocities the signal-to-noise ratio for the smallest particles gets too low to be measured. Using two different threshold levels for the particle count rate enables an estimation of the number of small particles and thereby estimation of the number of missed particles at higher velocities. The particle density may, for example be corrected by means of the formula (equation 2):

$$\left[1 + c_2 \left(\frac{\frac{1}{t} - \frac{1}{t_{ref}}}{\frac{1}{t} + \frac{1}{t_{ref}}}\right) [(ratiotwothr_{ref} - ratiotwothr)]\right]$$

where $ratiotwothr_{ref}$ is the ratio of two threshold values (Nr of counts at high threshold level divided by the number of counts at low threshold level) for large particles and ratiotwothr is the ratio of two threshold values at an effective average transition time of the particle density (e.g. PM2.5) measurement. The difference is a measure for the number of small particles in the distribution. The effective average transition time t is the measured average transition time compensated by means of the angle between the first measurement beam and the particle flow vector given by (equation 3):

$$t = t_{meas} \cos(\alpha)$$

By multiplying the difference with a factor corresponding to a measure of the time difference with respect to the reference time a correction for the small particles in the distribution is made. The factor $c_2$ may be adapted by means of calibration experiments. The different thresholds may be generated by means of optical measures (e.g. first numerical aperture different than second numerical aperture), different sensitivities of the detectors (either physically or by means of different sensitivities set by the evaluator) or, for example, electronical filters applied to the self-mixing interference signal.

The particle density or PM 2.5 value may be calculated by means of the formula (equation 4):

$$PM2.5 = c_1 \frac{(n)}{T} \cdot \left(\frac{t * \cos(\alpha)}{t_{ref}}\right)^{1/4} \cdot \left[1 + c_2 \left(\frac{\frac{1}{t} - \frac{1}{t_{ref}}}{\frac{1}{t} + \frac{1}{t_{ref}}}\right) [(ratiotwothr_{ref} - ratiotwothr)]\right]$$

$c_1$ is a further calibration parameters which is determined in calibration experiments. n is the number of detected particles in the predetermined period T. The fourth root time factor for compensating the time dependence (or velocity dependence) includes an additional $\cos(\alpha)$ further improving coincidence of experiments with the laser sensor module with reference experiments.

It is mentioned that this is an example of correction to an optimum PM2.5 value or more generally particle density value using the information as given in this formula. Other parameters from the particle signals or from calibration may be used as well for even more accurate determination of the PM2.5 or particle density value.

The optical arrangement may be arranged to fold the first measurement beam such that a building height perpendicular to an exit window of the laser sensor module is smaller than 1 mm.

The optical arrangement may, for example, include two reflective surfaces which are arranged such that the first measurement beam is folded within the laser sensor module before traversing, for example, a lens focusing the first measurement beam to the first measurement volume. A required numerical aperture provided by means of the optical arrangement in combination with a focus position sufficiently far (e.g. 5 mm) out of the device requires a certain distance between the laser and the focusing optical device (e.g. lens). Building height of the laser sensor module may be reduced if the optical path of the first measurement beam is folded within the laser sensor module. The reduced building height of the laser sensor module may be especially advantageous if the laser sensor module is assembled in a mobile communication device like a smartphone.

The optical arrangement may be arranged such that the first measurement volume is arranged in a distance between 3 mm and 10 mm perpendicular to an exit window of the laser sensor module. The exit window may be identical with an optical focusing device for focusing the first measurement beam to the first measurement volume. The distance between 3 mm and 10 mm may reduce the effect of the surface of the exit window which may be integrated in a device surface with respect to the particle flow. A larger distance to the first measurement volume results in lower air velocities in case of practical air flow patterns due to the heat of the hand and/or the device in vertical position.

The laser sensor module may further include:
at least a second laser, being adapted to emit a second measurement beam,
the optical arrangement being further arranged to focus at least the second measurement beam to a second measurement volume, where the optical arrangement is characterized by a second numerical aperture with respect to the second measurement beam, where the second numerical aperture is arranged to detect a predetermined minimum particle size at the reference velocity, and where the first measurement beam and the second measurement beam mutually enclose an angle $\phi$ between 10° and 160°,
at least a second detector being adapted to determine a second interference or second self-mixing interference signal of a second optical wave within a second laser cavity of the second laser,
the evaluator is further adapted to receive detection signals generated by the second detector in reaction to the determined second self-mixing interference signals, where the evaluator is further adapted to determine at least a first average velocity of particles detected by the first detector and at least a second average velocity of particles detected by the second detector by means of the detection signals received in the predetermined time period, where the evaluator is further adapted to determine a second number of particles based on the detected signals provided by the second detector in the predetermined time period, where the evaluator is further adapted to determine a second particle density based on an average particle velocity determined at least by means of the first average velocity and the second average velocity, at least the first number of particles and at least the second number of particles, and where the evaluator is further adapted to determine a third particle density based on the first particle density and the second particle density.

The second laser and corresponding detector enables an independent determination of the velocity vector of the particle flow because two components of the velocity vector can be measured. The determination of the average velocities of the particles therefore enables an independent determination of the particle density based on the first and the second laser self-mixing interference signals. This second particle density can be combined with the first particle density determined as described above. For this purpose the first particle density using a single axis can be used, but preferably the first particle density as an average result of both single axes may be used. This combined third particle density is characterized by smaller error compared to the transition time based laser sensor module and the velocity based laser sensor module. The velocity based laser sensor module may also work without the first particle density if the laser sensor module is arranged to perform the steps according to the second method of particle detection described below. The at least two laser beams or measurement beams mutually enclosing an angle $\phi$ between 10° and 160° (preferably between 20° and 140°, most preferably 50° and 70°) are used in order to determine two independent velocity components to determine the average velocity.

The first measurement beam preferably encloses a first angle $\beta1$ with a reference surface, where the second measurement beam encloses a second angle $\beta2$ with the reference surface, where a first projection of the first measurement beam on the reference surface and a second projection of the second measurement beam on the reference surface enclose an angle $\gamma$ between 20° and 160°, preferably between 30° and 120° and most preferably between 80° and 100°.

The reference surface or detection surface may be the surface of the device including the laser sensor module. The first and the second measurement beams are emitted through a transmissive area of the reference surface (window). This configuration is especially suited for particles flows, which are parallel to the reference surface (see FIG. 2). Such a device may be a stationary device like a sensor box or a mobile device like a smartphone. The reference surface may, for example, be the surface of the display of the smartphone. The user may hold the smartphone or mobile communication device such that the surface of the display is parallel or perpendicular to the surface of the ground. Additional sensors of the device may assist to provide the correct position of the device with respect to surface of the ground and/or the additional velocity data may be used to obtain a more optimum measurement of the particle concentration (e.g. acceleration sensors and the like which may be used for a compass or level application of the smartphone). The first measurement beam may in a special case preferably enclose an angle $\beta1=45°$ with the reference surface, where the second measurement beam may preferably enclose an angle of β2=45° with the reference surface. The projections of both measurements beams may in this case preferably enclose an angle γ=90°. Each velocity vector of the a particle flow parallel to the reference surface encloses in this case with the first or the second measurement beam an angle 90-α of 45°. The angle φ is in this case 60°.

It is mentioned that in case of failure of the detection of the second and consequently the third particle density measurement, for instance due to a blockage of one of the laser beams or a broken laser, the first particle density measurement by means of the remaining laser gives a nice fall back scenario. The blocked or damaged laser may be switched off in order to safe power. Alternatively, the measurement result provided by the corresponding detector may be not evaluated or ignored in order to avoid the corresponding noise.

The reference velocity may be chosen such that error minimization within the predetermined velocity range including the reference velocity is symmetric with respect to the reference velocity. Choosing the reference velocity in this way may enable an improved error correction especially with respect to the velocities at the boundary of the predetermined velocity range. The risk of an increasing systematic error at the upper or lower boundary of the velocity range may decrease.

Experiments have shown that the count rate of the laser sensor module as a function of the particle velocity can in good approximation be described by means of a power law. Therefore a reference velocity being on a logarithmic axis near to or in the middle of the velocity range seems to be a good choice in order to enable a symmetric error minimization with respect to the reference velocity in the predetermined velocity range. The velocity range may, for example, be bounded by 0.01 m/s and 6 m/s for particle density detection by means of mobile handheld devices. Reference velocity may in this case be preferably around 0.2 m/s for the numerical aperture of the optical arrangement of 0.03 in order to determine a reliable value of the particle density.

The first numerical aperture may be the same as the second numerical aperture. This does not mean that variations are excluded.

The velocity values v can be determined by means of the measured frequency values f of the self-mixing interference signals by means of the formula (equation 5):

$$v=f*\lambda/(2*\sin(\alpha)),$$

where λ is the wavelength of the measurement beam (e.g. 850 nm) and the angle 90-α is the angle enclosed between the velocity vector and the respective measurement beam, which can (at least approximately) be determined based on the first and the second self-mixing interference signal. In case the particle flow is parallel to a detection surface (e.g. surface of a mobile phone) and both measurement beams enclose an angle of 45° with the detection surface and the projections of the measurement beams on the detection surface enclose an angle γ of 90° the angle 90-α is 45° (fixed). Even in case that the flow is not perfectly parallel there are only minor errors.

Determination of the velocity may be improved by adapting analysis of the measured self-mixing interference signals to the effective length or measurement time of the signal. The effective length of the signal depends on the velocity, the beam size and the angle α. The effective length or measurement time may be determined by detecting in the time domain the duration that the signal is above a certain threshold value.

The average particle velocities $v_{av1}$ with respect to each measurement beam i and the total average velocity $v_{av}$ are given in case of two measurement beams by the formulas (equation 6):

$$v_{av1}=\Sigma v(j)/N \text{ and } v_{av2}=\Sigma v(k)/M, v_{av}=\text{sqrt}(v_{av1}^2 \pm v_{av2}^2),$$

where v(j), v(k) are the velocities measured in the first and second measurement volume, N is the total number particles detected in the first measurement volume and M is the total number particles detected in the second measurement volume in the respective measurement time interval. The equation for the average velocity can be easily adapted in case the measurement beams having a different angle (in the plane parallel to the window than 90 degrees).

The evaluator may be further adapted to correct the determined second particle density by a factor including the cube root of the ratio between the reference velocity and the determined average particle velocity.

The factor including the cube root of the ratio between the reference velocity and the determined average particle velocity is used to compensate for the velocity dependence of the particle counts at a given reference particle density which shows a $v^{1/3}$ dependency. The reference velocity is in fact chosen such that this velocity dependency is minimized within the predetermined velocity range.

Furthermore, the first measurement volume may be linearly extended in the direction of the first measurement beam and the second measurement volume may be linearly extended in the direction of the second measurement beam. The evaluator may in this case be adapted to determine a first relative likelihood for detection of particles in the first measurement volume. The evaluator may be further adapted to determine a second relative likelihood for detection of particles in the second measurement volume. The evaluator may be further adapted to correct the determined particle density by means of the first relative likelihood and the second relative likelihood.

Determination of the particle density (e.g. PM 2.5 value) may be further improved by recognizing that a small numerical aperture does have the effect that the measurement volumes are linearly extended along the measurement beam. Focusing by means of an optical arrangement with smaller numerical aperture extends the range along the measurement beam in which a particle can be detected. Likelihood of a particle to be detected by the first or the second measurement beam is a function of angle of the air movement with respect to the optical axis of the respective measurement beam. The respective likelihood can be determined based on the calculated average velocities measured in the first measurement volume and the second measurement volume because of the at least approximately determined angle enclosed between the particle flow and both measurement beams. Determination of this angle is in a 3D situation not perfect by means of a laser sensor module including only two lasers. However, it enables determination of the particle density with an error of less than 20% which is sufficient for, example, a handheld mobile communication device providing an indication whether the particle density is too high (e.g. smog) to jog outside.

The (optional) correction may be calculated in case of a laser sensor module with two measurement beams based on the determined average velocities given above by the following formulas (equation 7):

$$p_1 = \sqrt{\frac{0.5v_{av1}^2 + v_{av2}^2}{v_{av1}^2 + v_{av2}^2}} \quad p_2 = \sqrt{\frac{v_{av1}^2 + 0.5v_{av2}^2}{v_{av1}^2 + v_{av2}^2}}$$

where $p_1$ is the likelihood of a particle to be detected in the first measurement volume and $p_2$ is the likelihood of a particle to be detected in the second measurement volume.

The evaluator may be further adapted to determine a first particle count rate at a first signal to noise ratio threshold level and a second particle count rate at a second signal to noise ratio threshold level different than the first signal to noise ratio threshold level. The evaluator is further adapted to correct the determined second particle density by means of the first particle count rate and the second particle count rate.

Experiments and model calculations have shown that at higher velocities the signal-to-noise ratio for the smallest particles gets too low to be measured. Using two different threshold levels for the particle count rate enables an estimation of the number of small particles and thereby estimation of the number of missed particles at higher velocities. The particle density may, for example be corrected by means of the formula:

$$\left[1 + c_2\left(\frac{v_{av} - v_{ref}}{v_{av} + v_{ref}}\right)[(ratiotwothr_{ref} - ratiotwothr_{av})]\right]$$

where $ratiotwothr_{ref}$ is the ratio of two threshold values (Nr of counts at high threshold level divided by the number of counts at low threshold level) for large particles and $ratiotwothr_{av}$ is the ratio of two threshold values at the average velocity of the particle density (e.g. PM2.5) measurement. The difference is a measure for the number of small particles in the distribution. By multiplying the difference with a factor corresponding to a measure of the velocity difference with respect to the reference velocity a correction for the small particles in the distribution is made. The different thresholds may be generated as described above.

The combination of number of detected particles and the detected average velocities results in a particle density. The particle density can be expressed for instance as a PM2.5 value. The evaluator may, for example, include one ASIC which is adapted to evaluate the self-mixing interference signals generated by means of first, second and optionally third laser in combination with the first, second or third detector. Alternatively, each detector may be coupled to a separate ASIC.

The PM 2.5 value may be calculated by means of the formula (equation 8):

$$PM2.5 = c_1 \frac{(n/p_1 + m/p_2)}{T} \cdot \left(\frac{v_{ref}}{v_{av}}\right)^{1/3} \cdot$$

$$\left[1 + c_2\left(\frac{v_{av} - v_{ref}}{v_{av} + v_{ref}}\right)[(ratiotwothr_{ref} - ratiotwothr_{av})]\right]$$

where $c_1$ is another calibration coefficient and T is the predetermined time period. The calibration coefficient $c_1$ is determined based on reference experiments by means of, for example, professional equipment and reference particle concentrations. An example of calibration factors determined by calibration experiments is $c_1$=7.8, $c_2$=2.7. The formula given above results in a reliable detection of the particle density in the velocity range between 0.01 m/s and 7 m/s with a standard deviation of around 0.2 with respect to calibration experiments in the same velocity range.

The laser sensor module may include at least a third laser being adapted to emit a third measurement beam. The optical arrangement is arranged to focus the third measurement beam to a third measurement volume. The first measurement beam, the second measurement beam and the third measurement beam mutually enclose the angle between 10° and 110° (preferably 90°). The laser sensor module further includes a third detector being adapted to determine a third interference or third self-mixing interference signal of a third optical wave within a third laser cavity of the third laser. The evaluator is further adapted to receive a detection signal generated by the third detector. The evaluator is further adapted to determine a third average velocity of particles detected by the third detector within the predetermined time period. The evaluator is further adapted to determine a third number of particles by means of the detection signals generated by the third detector in the predetermined time period. The evaluator is further adapted to determine a particle density based on an average particle velocity determined by means of the first average velocity, the second average velocity and the third average velocity and the first number of particles, the second number of particles and the third number of particles.

The third laser enables an improved determination of the direction of the particle flow because all three velocity components can be measured. A determination of the average velocity may therefore be improved. Furthermore, an additional measurement volume is added such that the particle count rate increases. Further lasers and detectors may optionally be added in order to increase reliability (redundant laser).

The first measurement volume may at least partly overlap with the second measurement volume or even third measurement volume. Overlapping measurement volumes may have the advantage that the same particle may be used to determine the velocity vector of the particle velocity. Accuracy of the measurement of the average velocity and the angle between measurement beams and particle flow may therefore be improved. Size of the laser sensor module may increase because of the distance between the lasers which is needed to enable overlapping of the measurement volumes.

The first measurement volume may alternatively be different from the second measurement volume and in case of laser sensor module with three measurement beams also different from the third measurement volume. The measurements beams can in this case be emitted nearly from the same position. This enables a very compact laser sensor module in which all two or three lasers are arranged very close to each other.

Such a configuration may especially be useful in case of integrated laser configurations in which the first laser and the second laser (and optionally the third laser) include semiconductor layers provided on one, semiconductor chip. The electrical contacts of the layers have to be arranged such that an independent measurement of the first, second and optionally third self-mixing interference signal is possible.

The laser sensor module may further include an electrical driver. The electrical driver may be adapted to electrically drive the laser or lasers such that the lasers emit the measurement beams.

The laser sensor module may additionally include an interface by means of which control signals, electrical driving signals or detection signals can be exchanged with an external controller.

The laser sensor module according to any embodiment described above may be arranged to detect the particle density in a first mode. The laser sensor module may be further arranged to detect a proximity of an object with the size of at least 1 mm in a second mode. When the laser sensor module is used for particle density detection preferably DC drive current is used and the particles are detected by the modulations in the self-mixing interference signal as described above.

The laser sensor module may according to an alternative embodiment be arranged to detect a particle density of particles with a particle size of less than 20 µm. The laser sensor module may be further arranged to detect a presence of an object within a predefined detection range from a light emission surface of the laser sensor module, where the size of the object is preferably at least 1 mm along the longest extension. The laser sensor module includes:
- at least a first laser being adapted to emit a first measurement beam,
- an optical arrangement being arranged to focus the first measurement beam to a first measurement volume, where the optical arrangement is characterized by a first numerical aperture with respect to the first measurement beam between 0.02 and 0.1,
- at least a first detector being adapted to determine a first interference or self-mixing interference signal,
- an evaluator, where the evaluator is adapted to receive first detection signals generated by at least the first detector in reaction to the determined first interference or self-mixing interference signal, where the evaluator is further adapted to differentiate by means of the first detection signal between presence of the object within the predefined detection range and presence of particles in the first measurement volume.

The object may, for example, be a finger or part of a hand of the user for gesture control or alternatively a dirt particle avoiding or reducing reliable detection of a particle density.

A laser sensor module or particle sensor in a smartphone application should have good particle count rate and small minimum detected particle size at low velocities of typically e.g. 0.2 m/s. To accommodate for this, the numerical aperture (NA) of the system should be chosen relatively small, e.g. NA=0.03. This small NA is favorable to be able to detect large objects at relatively large distances. E.g. the focused spot for particle detection typically will be chosen 5 mm out of the smartphone cover glass. For the NA=0.03 system, large objects still can be observed by the interference signal or self mixing interference (SMI) signal at a distance of e.g. 15 cm. The actual distances depends apart from the NA also on the choice of other system parameters (e.g. power and the reflection properties of the object.

Experiments have shown that single axis particle sensors, using a transition time algorithm to determine the particle speed, are possible. Furthermore a 2 or 3-axis system does not have to be orthogonal for accurate particle detection results. This means that those particle sensors can use relatively small beam angles (in the range between 10 and 35 degrees) with respect to the normal of the smartphone surface. This is a favorable feature for proximity detection.

For particle detection a certain minimum NA is required, while for proximity detection a certain maximum NA is required. This gives the insight that for a combined laser sensor module the NA should be chosen in a specific range. The specific range is between 0.02 and 0.1 in order to enable reliable particle density detection and proximity detection for particle velocities or wind speed up to 6 m/s.

When the same laser sensor module is used for gesture control and/or proximity sensing a modulated drive current is used such that the distance (and/or the velocity) of the object can be detected. Gesture control means that a user can input information or manipulate information without physical contact to a surface of the laser sensor module or a device (e.g. smartphone) including the laser sensor module. Gesture control therefore enables contactless input or manipulation of information or presentation of information.

A rough way of proximity sensing may be performed by looking at the number of detected faults particle events. It would in this case not be necessary to provide a modulated drive current.

The predefined detection range of such a laser sensor module which is arranged to detect the particle density and presence of the object may be less than 20 cm. the first measurement volume is located between the light emission surface and the predefined detection range.

The laser sensor module which is arranged to detect the particle density and presence of the object, where the laser sensor module may further include an electrical driver. The electrical driver is arranged to electrically drive the first laser within a first time period by means of a first electrical drive current. The electrical driver is further arranged to electrically drive the first laser within a second time period different than the first time period by means of a second electrical drive current different than the first electrical drive current. The evaluator is arranged to detect the presence of the object within the predefined detection range within the first time period. The evaluator is further arranged to detect the presence of particles within the second time period. The first electrical drive current may, for example, be a modulated drive current (e.g. triangular). The second electrical drive current may, for example, be a DC current.

The laser sensor module which is arranged to detect the particle density and presence of the object, where the evaluator is arranged to detect a proximity of the object within the predefined detection range for gesture recognition within the first time period. The evaluator is further arranged to detect the particle density in the second time period. The evaluator may be arranged to detect a movement of the object within the first time period.

The laser sensor module which is arranged to detect the particle density and presence of the object, where the evaluator is further arranged to determine an average transition time of particles passing the first measurement volume in a predetermined time period based on a duration of the first interference or self-mixing interference signals generated by the particles as described above and below. The evaluator is further adapted to determine a number of particles based on the first interference or self mixing interference signals in the predetermined time period, and where the evaluator is further adapted to determine the particle density based on the average transition time and the number of particles as described above and below.

The laser sensor module described above enables particle detection without providing a predefined particle flow direction and velocity. Only one laser (and corresponding detector) emitting a measurement beam only in one direction may be used to generate first interference signals or self-mixing interference signals based on particles passing the first measurement volume in a predetermined time period. The interference signals or self-mixing interference signals are used to determine a number of particles and an average transition time of the particles passing the first measurement volume within the predetermined time period. The transition time of each single particle is a time difference between the start of the interference signal or self-mixing interference signals generated by the respective particle and the end of the interference signal or self-mixing interference signals generated by the respective particle. The average transition time is the average of all transition times measured within the predefined time. Certain thresholds may be defined in order to select interference signals or self-mixing interference signals which may improve determination of the average transition time. It may, for example, be possible to select only such interference signals or self-mixing interference signals with maximum signal amplitude above a predefined threshold amplitude value. The predefined threshold amplitude value may enable selection of such interference signals or self-mixing interference signals caused by particles passing a center line of the measurement volume along the direction of the measurement beam. Furthermore, the essentially circular shape of the particles and the first measurement beam causes that the transition time as a function of out of center distance reduces only gradually such that transition time detection is not sensitive with respect to the path of the particle through the first measurement volume. The average transition time and the number of particles detected by means of the interference signals or self-mixing interference signals are in case of an approximately known relationship between a velocity vector of the particle flow with the direction of the first measurement beam sufficient to determine the particle density.

The laser sensor module which is arranged to detect the particle density and presence of the object, where evaluator is further adapted to determine an angle enclosed between the first measurement beam and a velocity vector of the particles based on the first interference signal or self-mixing interference signals and the average transition time, and where the numerical aperture is arranged to detect a predetermined minimum particle size at a reference velocity. The reference velocity is chosen within a predetermined velocity range between 0.01 m/s and 7 m/s. The particle density is further determined based on the reference velocity and a reference beam diameter of the first measurement beam. The reference velocity and the reference beam diameter define a reference time in which a reference particle with a reference particle size passes the first measurement beam. A velocity vector of the reference particle is perpendicular to the first measurement beam. Further details are given in the embodiments described above and below.

The laser sensor module which is arranged to detect the particle density and presence of the object, where the laser sensor module includes:
  at least a second laser being adapted to emit a second measurement beam,
  the optical arrangement being further arranged to focus at least the second measurement beam to a second measurement volume, where the optical arrangement is characterized by the first numerical aperture with respect to the second measurement beam, and where the first measurement beam and the second measurement beam mutually enclose an angle between 5° and 70°, more preferably between 7° and 50° and most preferably between 10° and 35°,
  at least a second detector being adapted to determine a second interference signal or self-mixing interference signals,
  the evaluator is further adapted to receive second detection signals generated by the second detector in reaction to the determined second interference signals or self-mixing interference signals, where the evaluator is further adapted to determine the particle density based on the first detector signals and the second detection signals.

Two lasers and corresponding detectors may be used in case of a two-dimensional air or gas (or more generally fluid) flow to determine an average particle velocity for particle density detection. Three lasers and corresponding detectors are needed in case of an unknown three dimensional flow direction to determine an average particle velocity for particle density detection.

The laser sensor module which is arranged to detect the particle density and presence of the object, where the object is a blocking object disturbing particle detection. The evaluator is arranged to adapt detection of the particle density depending on the blocking object.

The laser sensor module will process the reflected light signal (based on Interference or Self-Mixing Interference SMI) to determine the particle count in the detection volume. The signal will be inaccurate in case that:
1. The window of the laser sensor module is completely blocked (i.e. light cannot exit the sensor module)
   a. The light is blocked before particles can be detected
   b. The light is blocked/reflected by the blocking object after focus of the beam, particle can still pass the detection beam
2. The light path of one of the measurement beams is partially blocked
   a. By large particles on the window
   b. By an object in the laser beam In all cases the sensor will give inaccurate results based on processing the signal received.

The laser sensor module detects the presence of something blocking the light path (either fully or partially) and therefore does not report particle readings during such times. The detection can be based on the pattern of the light reflected. Specifically:

Full blocking (1a): The interference signal or self-mixing interference signal results from effectively placing an object in an interferometer. Generally the object will be moving, resulting in higher or lower frequencies depending on the velocity of the movement of the object with respect to the optical axis of the detection beam. The combination of amplitude, time duration, noise floor level and frequency of these signals will be different from particle signals and these characteristics can be used to distinguish a particle from a blocked sensor. This also holds for a permanently blocked sensor (e.g. measuring while the laser sensor module is blocked by, for example, smartphone cover or put in the pocket) or for the situation that the sensor is blocked shortly (e.g. when a hand is passing the sensor).

In case the blocking object is after the detection volume (1b), two situations can occur, one like before that the background object gives rise to signals that dominate over the particle signals and should be handled as above. This can, however, also result in modifying the background noise floor, in case the influence of the object is sufficiently weak (i.e. distance far way (typically a few cm) from sensor). This can be identified by a time varying background noise or spectral change in noise spectrum.

In the case of partial blocking (2b), the evaluator of the laser sensor module may be arranged to subtract the influence of blocking object to give the result for the particle count as follows: in part of the interference signal or self-mixing interference signal (as function of time), the signal variations will be significantly higher (due to the blocking object to introduce a high signal component, hiding any particle movement). Particle concentration information may still be deduced from the remaining signal with reduced accuracy.

Another option to detect the partial blocking (2b) of the sensor may be to apply a modulated measurement beam. In that case the distance and velocity of the object can be derived. The distance may, for example, correspond with a disturbance coming from the cover glass (probably large particles), a cleaning advice can be given.

The laser sensor module may be arranged to determine interference signals instead of determining self-mixing interference signals. The laser sensor module may this case be arranged to provide a first reference beam based on the first measurement beam by means of partial reflection of the first measurement beam and a second reference beam by means of partial reflection of the second measurement beam. The first or the second measurement beam may be partially reflected by means of an optical structure arranged in the optical path of the first measurement or second measurement beam within the laser sensor module. The first detector is arranged to determine the first interference signal based on interference of reflected light of the first measurement beam and the first reference beam. The second detector is arranged to determine the second interference signal based on interference of reflected light of the second measurement beam and the second reference beam.

The laser sensor module, which is arranged to determine interference signals instead of determining self-mixing interference signals, may alternatively or in addition be arranged such that the first detector is separated from the first laser. The second detector is separated from the second laser. The laser sensor module further includes in this case a first beam splitter arranged to provide the first reference beam, and where the laser sensor module further includes a second beam splitter arranged to provide the second reference beam. The first and the second beam splitters may be first and second polarizing beam splitters. The laser sensor module may further include a first quarter wavelength plate arranged between the first beam splitter and a first focusing device for focusing the first measurement beam to the first measurement volume. The laser sensor module may further include a second quarter wavelength plate arranged between the second beam splitter and a second focusing device for focusing the first measurement beam to the first measurement volume. An air purifier, an exhaust hood, a car, a sensor box or a wearable device like a mobile communication device and alike may include the laser sensor module according to any embodiment as described above.

According to a further aspect a first method of particle density detection is presented. The first method includes the steps of:
  emitting at least a first measurement beam by means of a first laser,
  focusing the first measurement beam with a first numerical aperture, where the first numerical aperture is preferably arranged to detect a predetermined minimum particle size at a reference velocity, where the reference velocity is within a predetermined velocity range,
  determining a first interference signal or a first self-mixing interference signal of a first optical wave within a first laser cavity of the first laser,
  determining an average transition time of particles passing the first measurement volume in a predetermined time period based on a duration of first interference signal or the first self-mixing interference signals generated by the particles,
  optionally determining an angle enclosed between the first measurement beam and a velocity vector of the particles based on the first interference signal or first self-mixing interference signal (Doppler frequency and transition time), a wavelength of laser light emitted by the first laser and a reference beam diameter,
  determining a number of particles based on the first interference signals or first self-mixing interference signals in the predetermined time period, and
  determining a first particle density based on the average time duration, the number of particles and optionally the angle.

According to a further aspect a second method of particle density detection is presented. The second method includes the steps of:
  emitting at least a first measurement beam by means of a first laser,
  emitting at least a second measurement beam by means of a second laser,
  focusing the first measurement beam with a first numerical aperture, where the first numerical aperture is preferably arranged to detect a predetermined minimum particle size at a reference velocity, where the reference velocity is within a predetermined velocity range,
  focusing the second measurement beam with a second numerical aperture, where the second numerical aperture is preferably arranged to detect a predetermined minimum particle size at a reference velocity, where the reference velocity is within a predetermined velocity range,
  determining a first interference signal or first self-mixing interference signal of a first optical wave within a first laser cavity of the first laser,
  determining a second interference signal or second self-mixing interference signal of a second optical wave within a second laser cavity of the second laser,
  determining a first average velocity based on the first interference signal or the first self-mixing interference signal determined in a predefined time period,
  determining a second average velocity based on the second interference signal or the second self-mixing interference signal determined in a predefined time period,
  determining a first number of particles by means of the first interference signal or the first self-mixing interference signals determined in the predefined time period,
  determining a second number of particles by means of the second interference signal or the second self-mixing interference signals determined in the predefined time period,
  determining an average particle velocity based on at least the first average velocity and the second average velocity,
  determining a particle density based on at least the determined average velocity, the first number of particles and the second number of particles.

According to a further aspect a first computer program product is presented. The computer program product includes code means, which can be saved on at least one memory device of the laser sensor module or on at least one memory device of a device including the laser sensor module. The code means being arranged such that the method according to ab embodiment can be executed by means of at least one processing device of the laser sensor module or by means of at least one processing device of the device including the laser sensor module.

According to a further aspect a second computer program product is presented. The computer program product includes code means, which can be saved on at least one memory device of a velocity based laser sensor module which is arranged to determine average velocities based on at least a first and the second self-mixing interference signal or on at least one memory device of a device including the velocity based laser sensor module. The code means being arranged such that the second method can be executed by means of at least one processing device of the velocity based laser sensor module or by means of at least one processing device of the device including the velocity based laser sensor module.

The memory device or the processing device may be included by the laser sensor (e.g. electrical driver, evaluator etc.) or the device including the laser sensor module. A first memory device and/or first processing device of the device including the laser sensor module may interact with a second memory device and/or second processing device included by the laser sensor module.

The memory device or devices may be any physical device being arranged to store information especially digital information. The memory device may be especially selected out of the group solid-state memory or optical memory.

The processing device or devices may be any physical device being arranged to perform data processing especially processing of digital data. The processing device may be especially selected out of the group processor, microprocessor or application-specific integrated circuit (ASIC).

According to an alternative embodiment a method of detecting a particle density of particles with a particle size of less than 20 μm is provided. The method includes the steps of:
- emitting at least a first measurement beam by means of a first laser,
- focusing the first measurement beam with a first numerical aperture between 0.02 and 0.1,
- determining a first interference signal or self-mixing interference signal,
- differentiate between presence of an object within a predefined detection range and presence of particles in the first measurement volume, where the size of the object is preferably at least 0.5 mm more preferably at least 1 mm along the longest extension.

Further advantageous embodiments are defined below.

These and other aspects of the invention will be apparent from and elucidated with reference to the embodiments described hereinafter.

Various embodiments of the invention will now be described by means of the Figures. In the Figures, like numbers refer to like objects throughout. Objects in the Figures are not necessarily drawn to scale.

Self-mixing interference is used for detecting movement of and distance to an object. Background information about self-mixing interference is described in "Laser diode self-mixing technique for sensing applications", Giuliani, G.; Norgia, M.; Donati, S. & Bosch, T., Laser diode self-mixing technique for sensing applications, Journal of Optics A: Pure and Applied Optics, 2002, 4, S. 283-S. 294 which is incorporated by reference. Detection of movement of a fingertip relative to a sensor in an optical input device is described in detail in International Patent Application No. WO 02/37410 which is incorporated by reference. The principle of self-mixing interference is discussed based on the examples presented in International Patent Application No. WO 02/37410. A diode laser having a laser cavity is provided for emitting a laser, or measuring, beam. At its upper side, the device is provided with a transparent window across which an object, for example a human finger, is moved. A lens is arranged between the diode laser and the window. This lens focuses the laser beam at or near the upper side of the transparent window. If an object is present at this position, it scatters the measuring beam. A part of the radiation of the measuring beam is scattered in the direction of the illumination beam and this part is converged by the lens on the emitting surface of the laser diode and re-enters the cavity of this laser. The radiation re-entering the cavity of the diode laser induces a variation in the gain of the laser and thus in the intensity of radiation emitted by the laser, and it is this phenomenon which is termed the self-mixing effect in a diode laser.

The change in intensity of the radiation emitted by the laser or of the optical wave in the laser cavity can be detected by a photo diode or a detector arranged to determine an impedance variation across the laser cavity. The diode or impedance detector converts the radiation variation into an electric signal, and electronic circuitry is provided for processing this electric signal.

The self-mixing interference signal may in case of particle detection, for example, be characterized by a short signal burst or a number of signal bursts. The Doppler frequency as observed in these signals is a measure for the particle velocity along the optical axis. It may therefore be preferred to use a DC drive current in order to simplify signal detection and signal analysis. The duration and the intensity of the signal may optionally be used to determine the particle size.

A modulated drive current may be used in order to determine the position or velocity of the particle, for example, by means of self-mixing interference signals, which may be generated by reflection of laser light at bigger particles or disturbing objects. The distance (and optionally velocity) may be determined within one measurement or in a subsequent measurement step. It may therefore be possible or even beneficial to use a DC drive current in a first period in time in order to generate a particle measure of the intended particle number, velocity and a modulated drive current in order to determine false objects in the beam.

It is also possible to use the same laser sensor module as used for the particle sensing as a proximity sensor and/or a sensor for gesture control by a change of the operation mode. When the laser sensor module is used for particle detection preferably DC drive current is used and the particles are detected by the modulations in the self-mixing interference signal. When the same laser sensor module is used for gesture control and/or proximity sensing a modulated drive current is used and the distance (and/or the velocity) of the object can be detected. This detected distance can be used as a proximity sensor, for instance to measure the distance of the head to the smartphone. Alternatively, this measured distance can be used for gesture control, for example, zooming in and out a photograph by varying the distance of a finger to the sensor. It is recognized that the optimum low NA (numerical aperture) values required to detect particles at low velocities are very beneficial to realize proximity and gesture detection for the required distance ranges. For instance, an NA=0.03 system enables the detection of distances up to 5 cm.

FIG. 1 shows a principal sketch of a first laser sensor module 100. The laser sensor module includes one Vertical Cavity Surface Emitting Lasers (VCSEL) 111. The optical arrangement 150 includes in this case one lens with a numerical aperture of 0.025. The first laser 111 is coupled to a first detector 121 (e.g. integrated photodiode) such that a first self-mixing interference signal in a laser cavity of the first laser 111 can be detected. The detected first self-mixing interference signals are evaluated by means of evaluator 140, which is electrically connected to the first detector 121. The arrow indicates the direction of the particle flow. The laser sensor module may optionally include a first interface (not shown) which is arranged to receive electrical energy and control signals to drive the first laser 111. Furthermore, there may be a second interface, which is arranged to transfer the evaluated self-mixing interference signals and/or the determined particle density to an external processing device for further data processing. It is noted in case of a glass window in front of the sensor a small tilt of e.g. 5 degree may be preferred to prevent reflections from the window into the laser.

Figure 2:
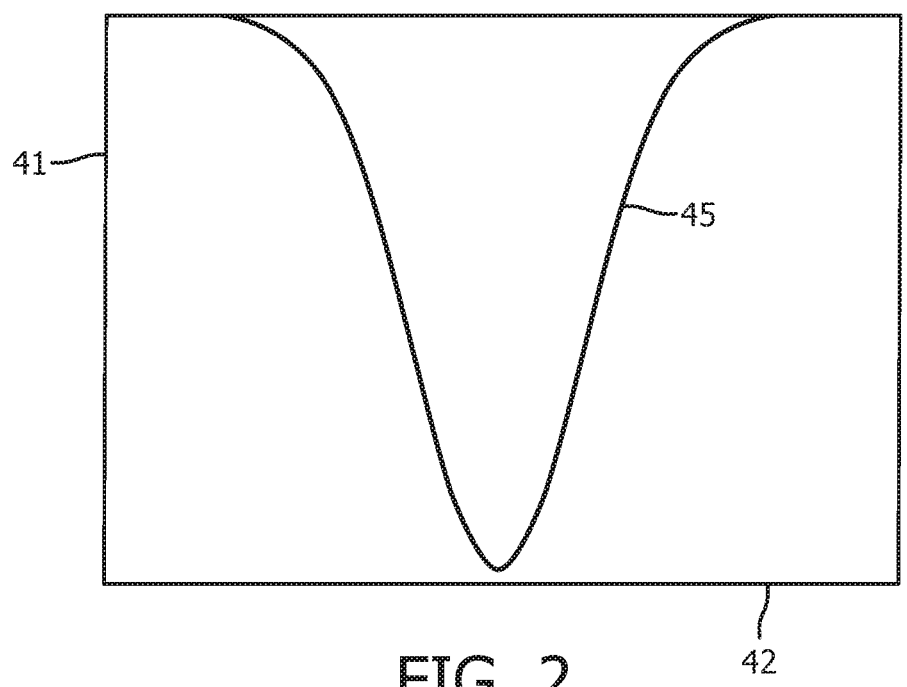
FIG. 2 shows a principal sketch of a first self-mixing interference signal.

FIG. 2 shows a principal sketch of a first self-mixing interference signal based on a particle with a velocity vector perpendicular to the first measurement beam 45. The abscissa 42 shows the time and the ordinate 41 the self-mixing interference signal in arbitrary units. The signal shows only the dip caused by the particle crossing the first measurement volume but no Doppler frequency. The width of the dip can be taken in order to determine a transition time of the particle crossing the first measurement volume. The transition time may, for example, be measured between the onset of the particle signal and the end of the particle signal. More sophisticated algorithms might be employed to fit the observed signal to a general particle signal function and use the fitting parameters as measure of the transition time. A multitude of such signals can be used to determine an average transition time.

Figure 3:
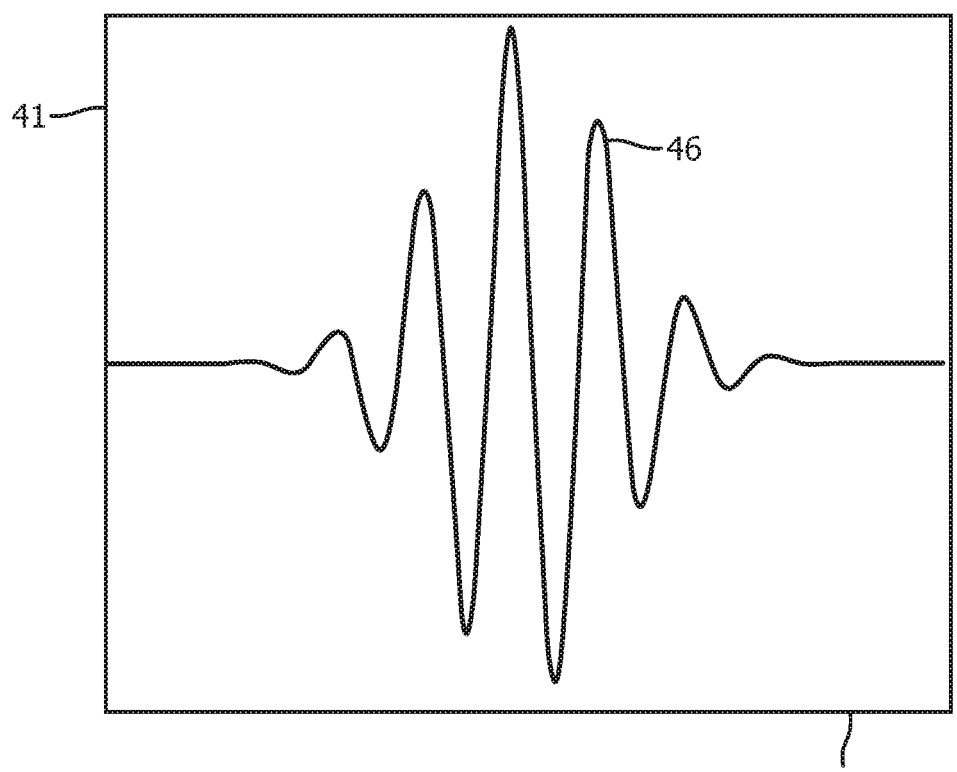
FIG. 3 shows a principal sketch of a second self-mixing interference signal.

FIG. 3 shows a principal sketch of a first self-mixing interference signal based on a particle with a velocity vector tilted with respect to the first measurement beam 46. The signal shows the Doppler frequency caused by the part of the velocity vector parallel to the first measurement beam. The width of the signal can again be taken in order to determine a transition time of the particle crossing the first measurement volume. A multitude of such signals can be used to determine an average transition time. The angle enclosed between the velocity vector and the first measurement beam can be calculated by means of the Doppler frequency times the average transition time, which gives a measure for the distance parallel to the first measurement beam and the reference beam diameter which give a measure for the distance of the particles perpendicular to the first measurement beam.

Figure 4:
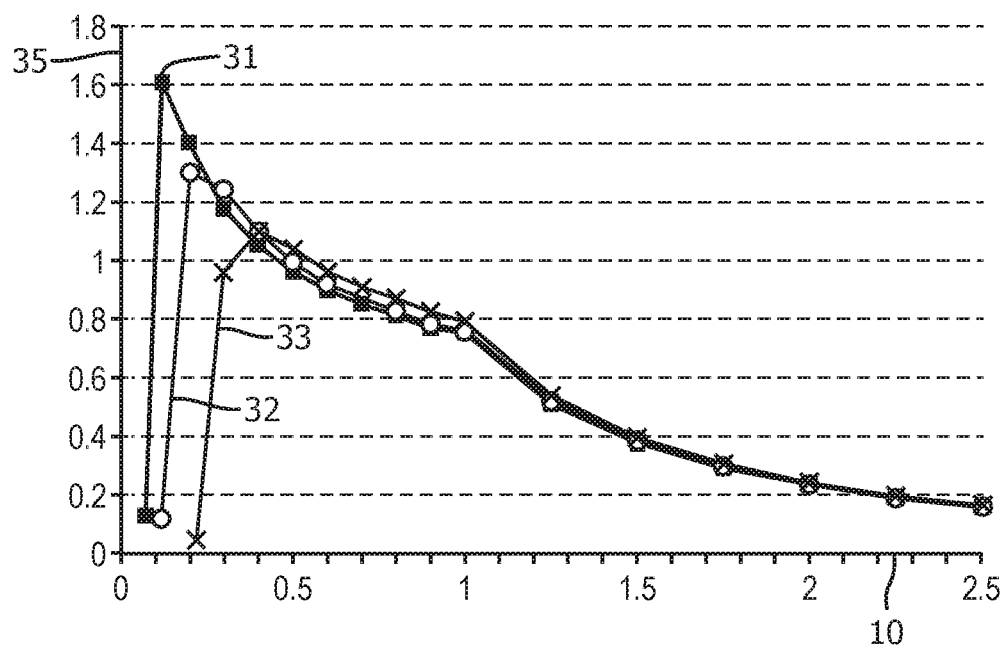
FIG. 4 shows velocity dependence of particle densities determined by means of a velocity based laser sensor module.

FIG. 4 shows velocity dependence of particle densities determined by means of a velocity based laser sensor module which is compared with reference experiments with professional equipment. The ordinate 35 shows the relative particle density. An optimal result would be that both the velocity based laser sensor module and the professional equipment measure the same particle density. This would result in a straight line parallel to abscissa 10 showing the particle size with ordinate value 1. Each measurement shows the comparison within a bin of 0.1 micron. The 0.5 micron point shows the comparison of particles with a size between 0.45 and 0.55 micron. The comparison has been made by means of particle distribution with a variation of the particle size in accordance with the respective bin. Line 31 shows a determined PM 2.5 values at a velocity of 0.05 m/s. Line 32 shows a determined PM 2.5 values at a velocity of 0.6 m/s. Line 33 shows a determined PM 2.5 values at a velocity of 7 m/s. All lines 31, 32, 33 were scaled with a factor $(v_{ref}/v)^{1/3}$ in accordance with equation 8 discussed above in order to minimize the velocity dependence in the observed range of particle sizes (e.g. between 0.1 μm and 2.5 μm).

Figure 5:
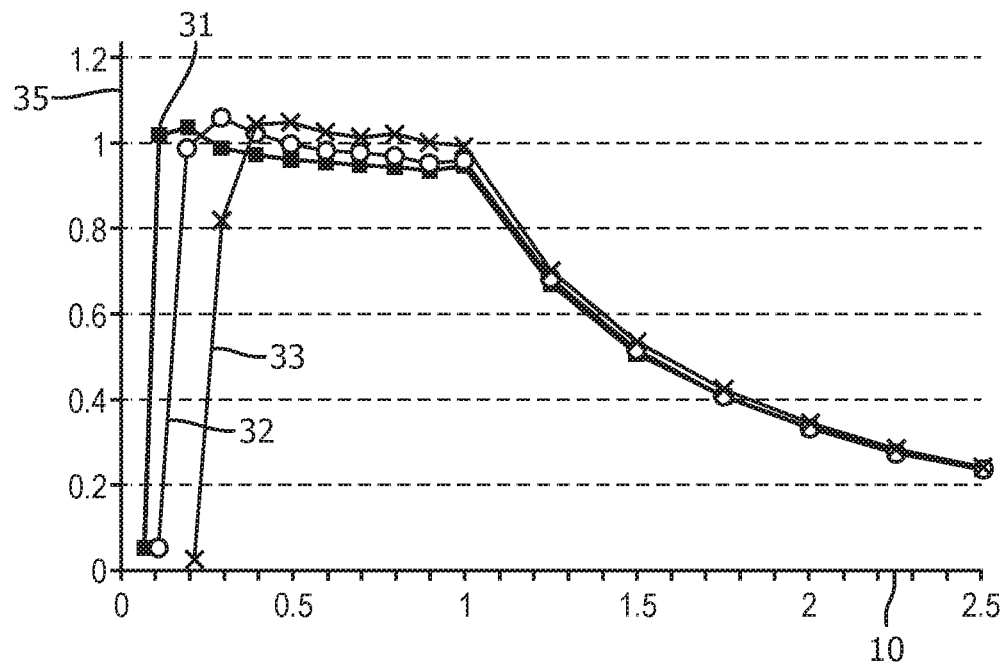
FIG. 5 shows velocity dependence of particle densities determined by means of a time based laser sensor module.

FIG. 5 shows velocity dependence of particle densities determined by means of a transition time based laser sensor module. The presentation is the same as described with respect to FIG. 4. Lines 31, 32, 33 were scaled in this case with a factor $(t/t_{ref})^{1/4}$ in accordance with equation 4 discussed above. The comparison of FIG. 4 and FIG. 5 shows that the transition time based laser sensor module shows nearly a perfect behavior (ordinate value near to 1) up to a particle size of particle diameter of around 1 μm. Furthermore, the slow Adependence with respect to the average transition time (proportional to $t^{1/4}$) decreases sensitivity with respect to measurement errors of the average transition time. It is noted that this is a general trend graph, the sensitivity variations due to modulation in the MIE scattering characteristics as a function of particle size are not taken into account here.

Figure 6:
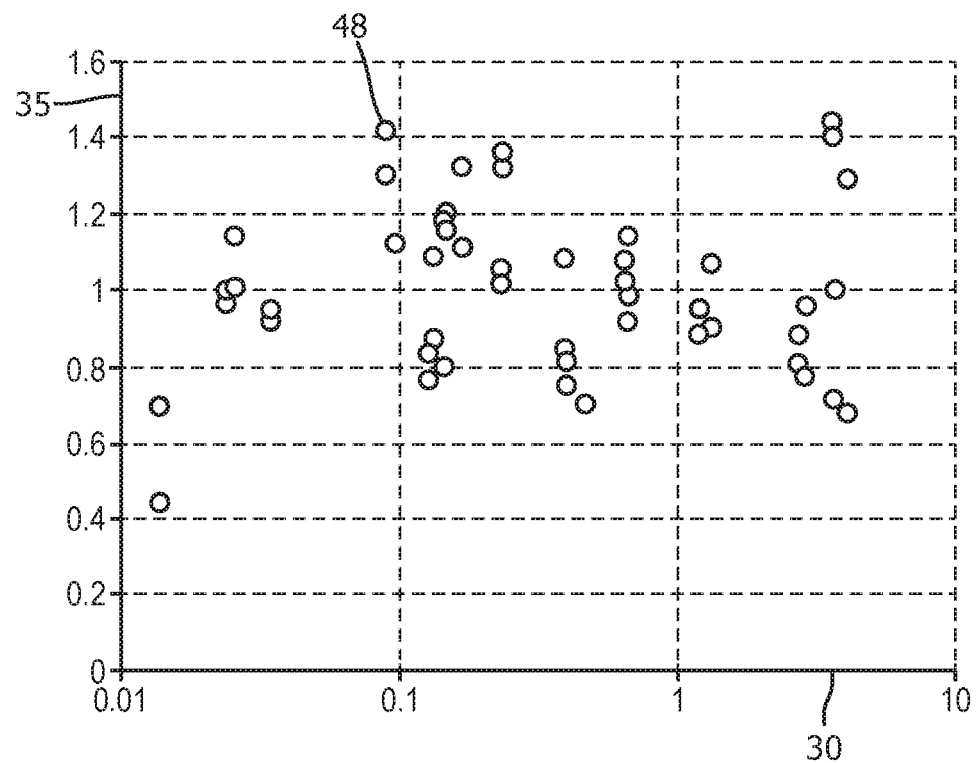
FIG. 6 shows measurement results.

FIG. 6 shows measurement results generated by means of the transition time based laser sensor module where the ordinate 35 shows again the relative particle density and the abscissa 10 shows the particle velocity. The standard deviation of the measurements at the different velocities in the velocity range between 0.01 m/s and 7 m/s is 0.22 which is excellent for such a simple laser sensor module including only one single laser and corresponding detector in order to give, for example, a qualitative indication of, for example, the air pollution.

Figure 7:
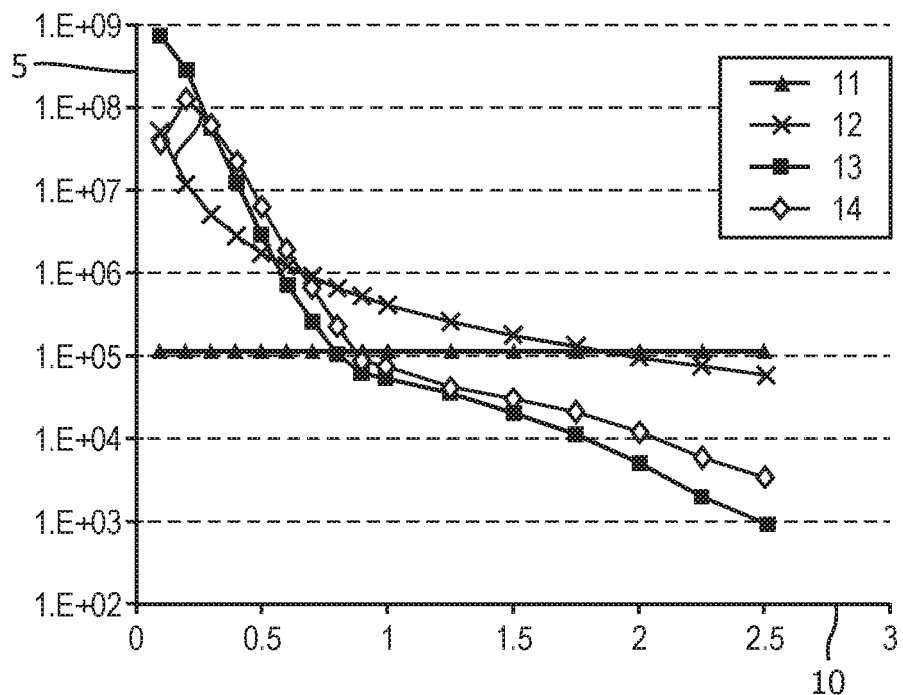
FIG. 7 shows a principal sketch of different particle distributions.

FIG. 7 shows a principal sketch of different particle distributions as a function of the particle size [μm] (abscissa 10). The ordinate 5 shows the number of particles per cubic meter per 0.1 μm bin. The number of particles as a function of particle diameter can be separated into bins of 0.1 micron. The 0.5 micron point the graph shows the number of particles between 0.45 and 0.55 micron. Particle distribution 11 shows a flat reference particle distribution with constant particle concentration across all bins. Particle distribution 12 shows a typical distribution of airborne particles. In general airborne particles are very fine particles made up of either solid or liquid matter that can stay suspended in the air and spread with the wind. Particle distribution 13 results from incense. Particle distribution 14 corresponds to the average particle distribution of Shanghai smog. The different particle distributions show that the particle distribution in polluted air is mainly dominated by small particles at a particle size of less than 0.5 μm. Furthermore, the number of particles at a given particle size depends on the source of the particle pollution. There is therefore no reference particle distribution. A reliable measurement of particle density has therefore at least in within certain limits to take into account the different particle distributions.

Figure 8:
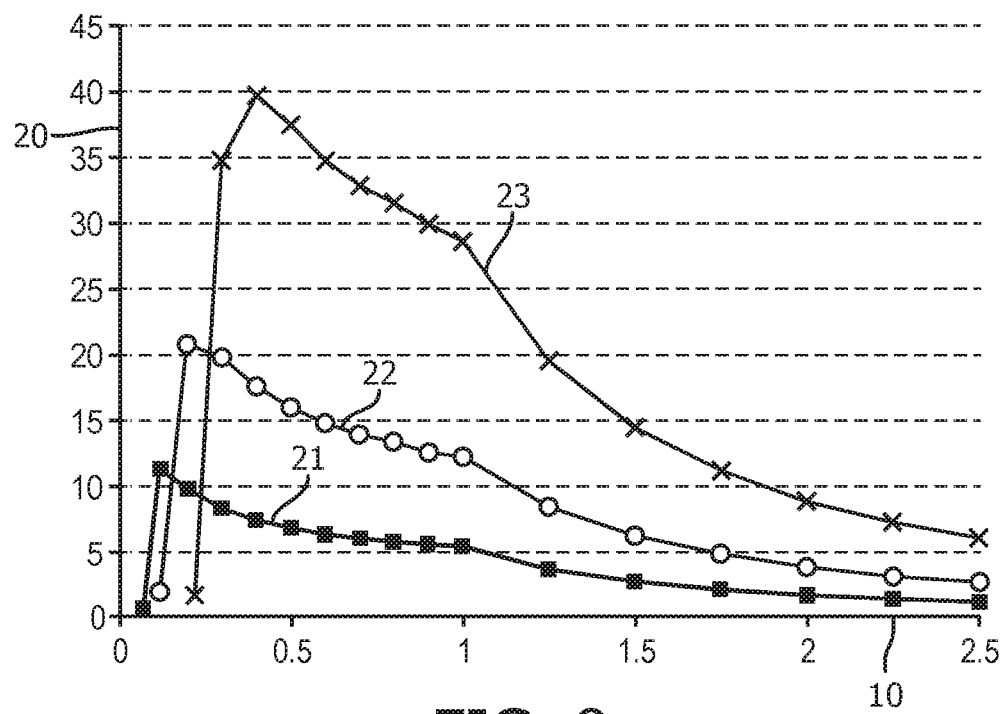
FIG. 8 shows particle counts depending on particle diameter at different particle velocities.
Figure 9:
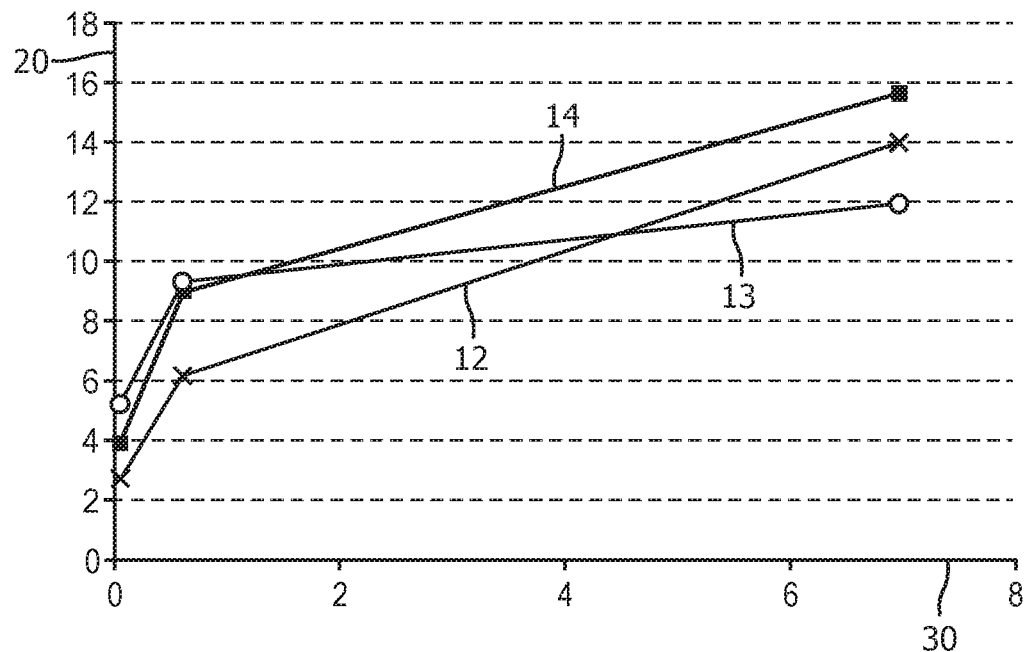
FIG. 9 shows particle counts as a function of velocity for different particle distributions.
Figure 10:
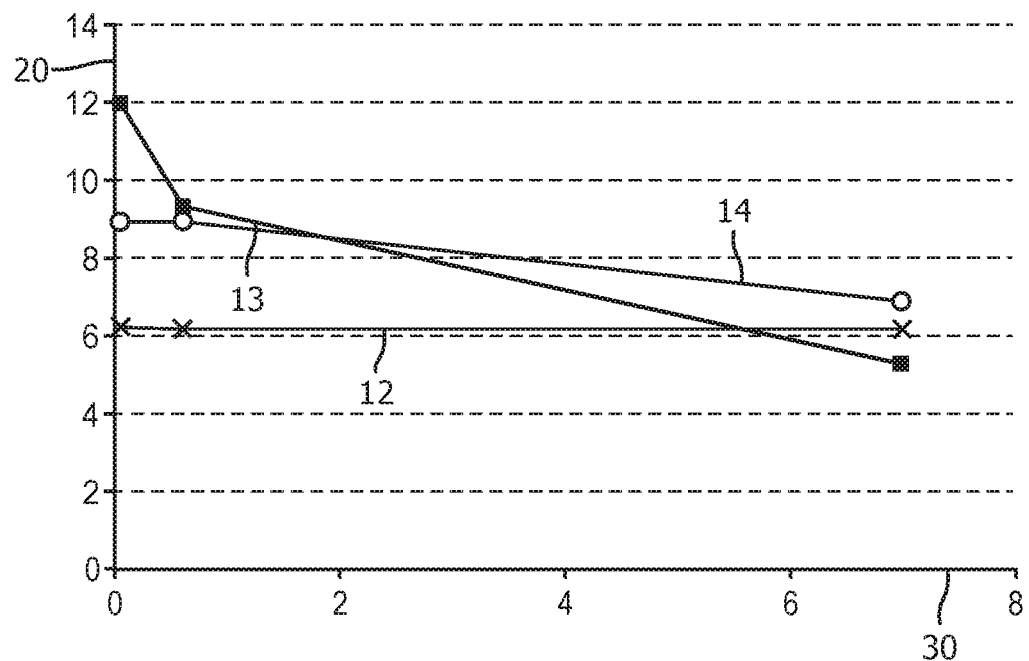
FIG. 10 shows corrected particle counts as a function of velocity for different particle distributions.
Figure 13:
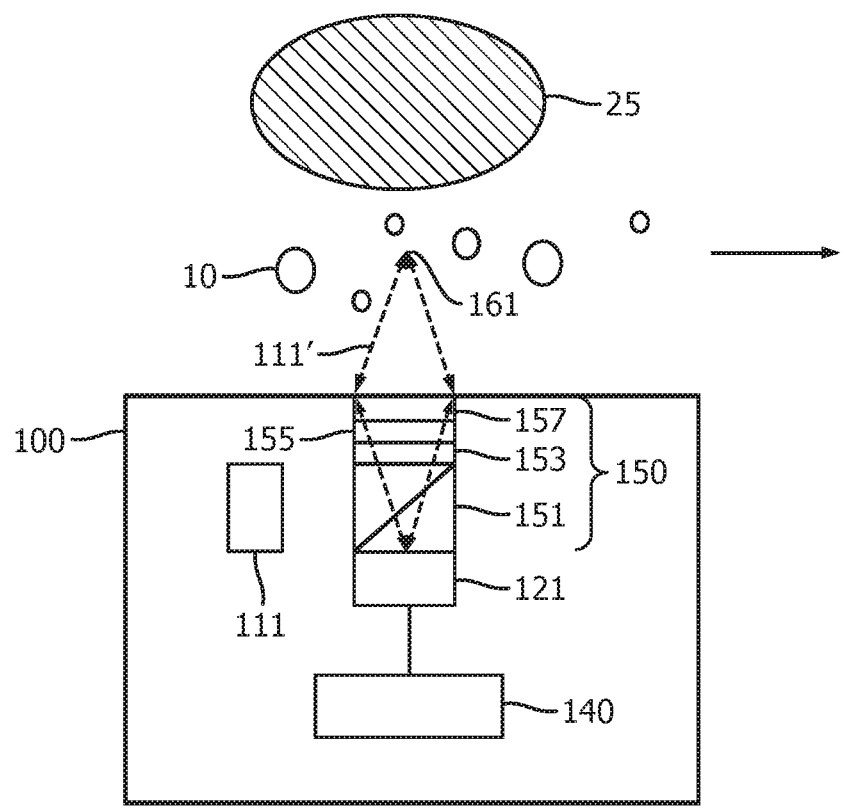
FIG. 13 shows a principal sketch of a second laser sensor module.

FIG. 8 shows particle counts [counts/(minute*μg/m$^3$)] (ordinate 20) depending on particle diameter (abscissa 10) at different particle velocities which were determined by means of laser sensor module including at least two lasers with two measurement beams directed in different directions (see FIG. 13). Line 21 shows particle counts at a first velocity of 0.05 m/s. Line 22 shows particle counts at a second velocity of 0.6 m/s and line 23 shows particle counts at the third velocity of 7 m/s. The particle counts or count rates are detected by means of a laser sensor module with a numerical aperture of 0.045 which is designed for a reference velocity of 0.6 m/s. For the model maximum likelihood detection and particle distributions of incense (many very small particles), Shanghai smog and airborne particles (many large particles) are used (see FIG. 7). The particle counts or count rate is basically proportional to $v^{1/3}$ for particles with a particle size larger than 0.5 μm. Particles with a size smaller than 0.3 μm are not detected at high velocities. FIG. 9 shows the corresponding particle counts 20 as a function of velocity 30 for the different particle distributions 12, 13, 14 as discussed with respect to FIG. 7. FIG. 10 shows corrected particle counts 20 as a function of velocity 30 for the different particle distributions. The particle counts have been corrected by means of the $v^{1/3}$ velocity dependence using a correction factor $(V_{ref}/V_{av})^{1/3}$, where the reference velocity $v_{ref}$ is 0.6 m/s as an already mentioned above and the average velocity $v_{av}$ is determined by means of the self-mixing interference signals by means of the formula $v=f*\lambda/(2*\sin(\alpha))$ as described above. The count rate versus velocity for the airborne 12 (large particle) distribution nicely fits the $v^{1/3}$ relationship. Knowing the velocity from the Doppler signals, the particle density (PM2.5 value) can be derived and the result hardly depends on the velocity. For the distributions 13, 14 with smaller particles the PM2.5 values at high velocities will be too low because many small particles are not detected any more.

Figure 11:
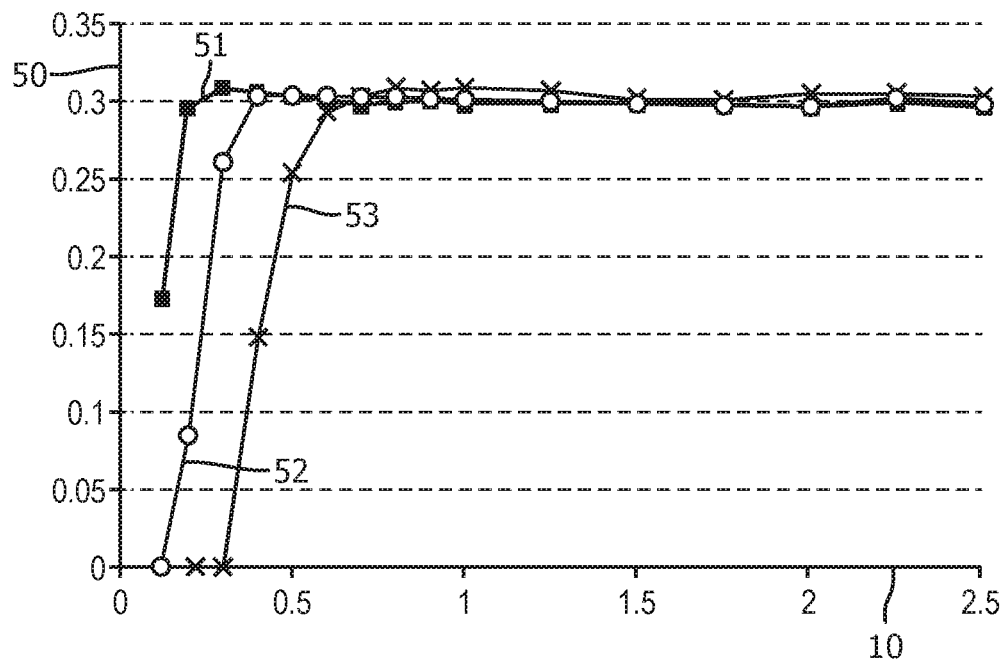
FIG. 11 shows the ratio of particle counts at different signal-to-noise ratio threshold levels as a function of the particle diameter for different particle velocities.
Figure 12:
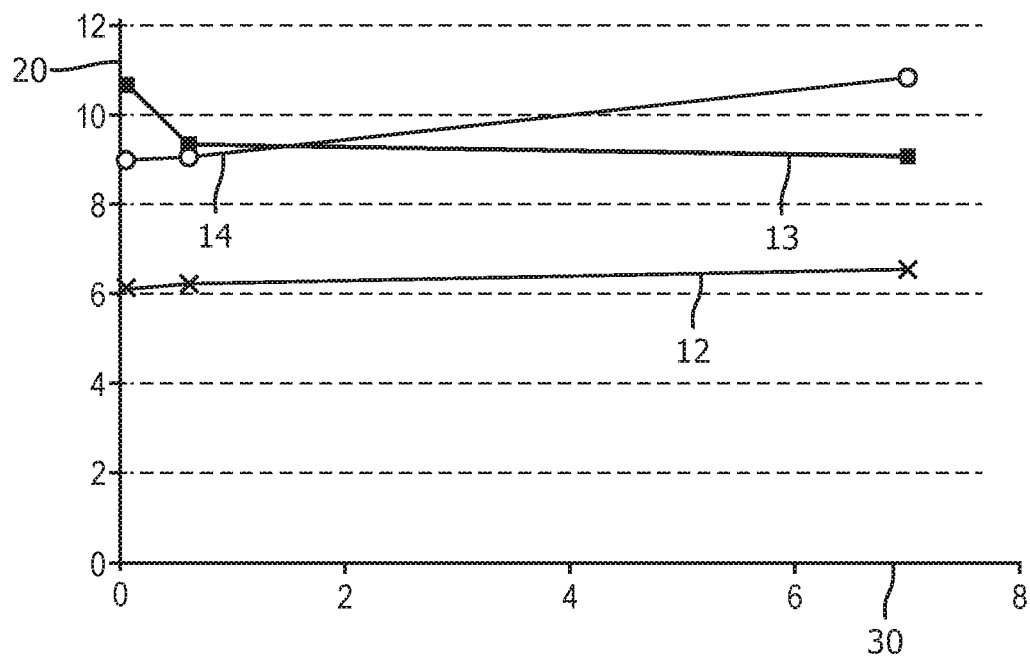
FIG. 12 shows particle counts corrected for small particles.

FIG. 11 shows the ratio of particle counts at different signal-to-noise ratio threshold levels 50 as a function of the particle diameter or size 10 for different particle velocities. Line 51 shows a ratio of particle counts at a first velocity of 0.05 m/s. Line 52 shows a ratio of particle counts at a second velocity of 0.6 m/s and line 53 shows a ratio of particle counts at the third velocity of 7 m/s. By determining the count rate both at a threshold level of 6 and 15 times the noise level, a measure for the number of small particles is obtained. The weighted average over all particle sizes is a function of the particle distribution and the velocity. Maximum value in this example is 0.30 for airborne particles at 0.05 m/s, minimum value is 0.12 for incense at 7 m/s. A PM2.5 value with minimized error (see graph) is obtained using $$PM2.5 \propto \#_{meas} \cdot \left(\frac{v_{ref}}{v_{av}}\right)^{1/3} \cdot \left[1 + c_2\left(\frac{v_{av} - v_{ref}}{v_{av} + v_{ref}}\right)[(ratiotwothr_{ref} - ratiotwothr_{av})]\right]$$

with $\#_{meas}$=number of measured particles, $c_2$=4.5, $v_{ref}$=0.6 m/s and ratiotwothr$_{ref}$=0.3. FIG. 12 shows particle counts 20 of the different particle distributions 12, 13 and 14 corrected for small particles by means of this formula. All particle distributions 12, 13 and 14 show an acceptable (nearly flat) count rate as a function of the velocity of the particles. Further improvement of particle density detection in case of small numerical apertures may be provided by determining the relative likelihood for detection as described above. Low frequency velocity variations can be handled by averaging across a number of measurement time periods.

FIG. 13 shows a principal sketch of a second laser sensor module 100. FIG. 13 shows a laser sensor module which is arranged to detect particle density and optionally objects 20 based on interference measurements. The laser sensor module 100 includes in this embodiment and for clarity reasons only one first laser 111 to discuss the measurement principal. Extension to two, three or more lasers and corresponding detectors is apparent from FIGS. 21 and 22. The first laser 111 emits laser light to a polarizing beam splitter 152. The laser light is reflected at the polarizing beam splitter 152 and passes a quarter wavelength plate 153, an optical filter device 155 and a focusing device 157. The quarter wavelength plate 153 is set with its optical axis at 45° with respect to the polarization direction of the first laser 111. In this way, circular polarized light is made. The optical filter device 155 is characterized by a narrow passband around the emission wavelengths of the first laser 111 (e.g. 850 nm). The optical filter device 155 is optimized to suppress ambient light and is only necessary if ambient light may cause detection problems. The focusing device 157 may, for example, be a lens or a lens or arrangement including more than one optical device. The second laser sensor module 100 is arranged such that a defined part of the laser light is reflected at one of the interfaces (e.g. interface between the optical filter device 155 and air) before the laser light leaves the second laser sensor module 100. The part of the laser light leaving the second laser sensor module 100 is the first measurement beam 111' which is focused to the first measurement volume 161. Particles 10 reflect a part of the first measurement beam 111' such that a part of the reflected light reenters the second laser sensor module 100. The reflected light reentering the second laser sensor module passes the focusing device 157, the optical filter 155 and the quarter wavelengths plate 153. Linear polarized light passes the polarizing beam splitter 152 and interferes with the laser light reflected at one of the interfaces before leaving the second laser sensor module 100. A first detector 121 (e.g. photo diode) detects the interfering light and a corresponding measurement signal is transmitted to evaluator 140. Particle density may be determined based on the number of particles determined in a given time period and the particle velocity (e.g. by means of measuring the transition time or based on different measurement beams 111', 112', 113' as described, for example, above and below). The second laser sensor module 100 may optionally be arranged to determine an object 25 (e.g. finger).

Figure 14:
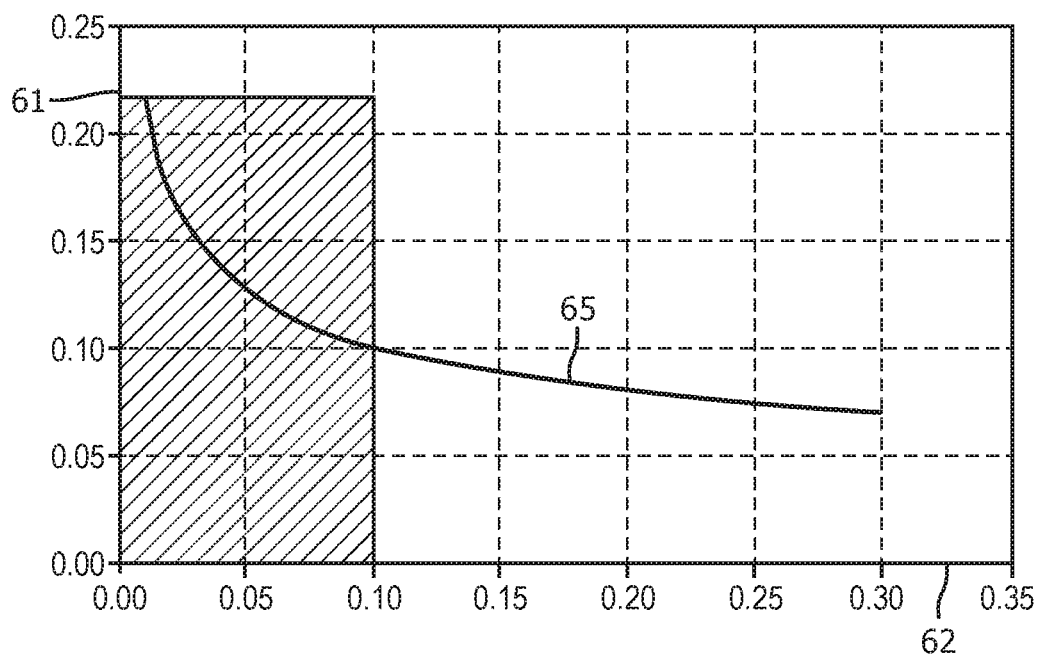
FIG. 14 shows the detection distance as a function of numerical aperture.

FIG. 14 shows the detection distance as a function of numerical aperture. The curve depends on the sensitivity for self-mixing interference of the specific laser and the used object. The curve thus shows the general trend but absolute values differ depending on the sensitivity for self-mixing interference of the specific laser. A measurement beam 111', 112', 113' emitted by a laser 111, 112, 113 that falls on an object 25 (e.g. skin) will backscatter to the laser 111, 112, 113. This will generate a Doppler signal that will be visible in the power spectrum of the signal when detected by a corresponding detector 121, 122. As the signal power of this Doppler signal will be larger than the noise it will be visible as a peak in the power spectrum. The Peak is broad enough to observe the peak height in the power spectral domain. The peak height of the Doppler signal in the power spectrum of the measured detector signal scales as $$\text{peak height} \propto \frac{1}{NAd^3} \quad d \gg d_{focus}$$

This formula is valid when the distance d from the lens of the object 25 (e.g. hand) is much larger than the distance $d_{focus}$ of the focus wrt to lens position). For numerical aperture (NA) NA 0.03, and focus at 5 mm from lens, the Doppler signal is empirically found to be observable up to e.g. 15 cm. Assuming a limit to SNR at 15 cm distance for NA=0.03, this gives $$NAd^3 = cst = 0.03 * .15^3 \Rightarrow d_{limit} = \sqrt[3]{0.03 * \frac{.15^3}{NA}}$$

FIG. 14 shows this function wherein the Y-axis shows the numerical aperture 62 and the Y-axis shows the detection distance 61 in meters. The desired range for proximity detection is bigger than 10 cm. The NA should therefore be smaller than 0.1 in order to enable proximity detection or gesture control as indicated by the square on the left side and FIG. 14.

Figure 15:
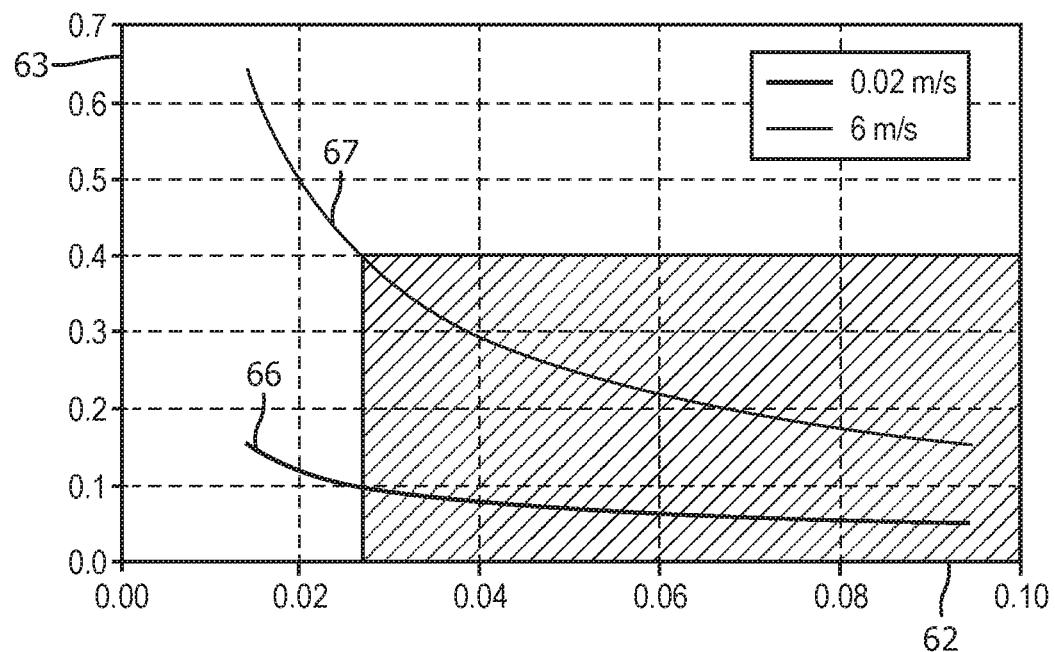
FIG. 15 shows minimum detected particle size as a function of numerical aperture.

FIG. 15 shows minimum detected particle size as a function of numerical aperture. The curves again depend on the sensitivity for self-mixing interference of the specific laser and the used object. The curves thus show the general trend but absolute values differ depending on the sensitivity for self-mixing interference of the measurement system. The X-axis shows again the numerical aperture 62 and the Y-axis shows the minimum particle size [μm] 63. Line 66 shows the minimum particle size which can be detected at a particle velocity of 0.02 m/s as a function of numerical apertur 62. Line 67 shows the minimum particle size which can be detected at a particle velocity of 6 m/s as a function of numerical aperture 62. From FIG. 15 follows that the NA for particle detection should preferably be chosen above 0.028 to be able to detect 0.4 micron particles at a velocity of 6 m/s as indicated by the square on the right side. A combination of both conditions discussed with respect to FIG. 14 and FIG. 15 requires for particle detection and proximity sensing a numerical aperture for the system of 0.028<NA<0.1. The range depends on the specific laser as discussed above. Detection of objects and smallest particles depends on system sensitivity and this is just an example for a specific system. The range is for a more sensitive system between 0.02<NA<0.06 and may be even between 0.015<NA<0.05 for most sensitive available systems.

Figure 16:
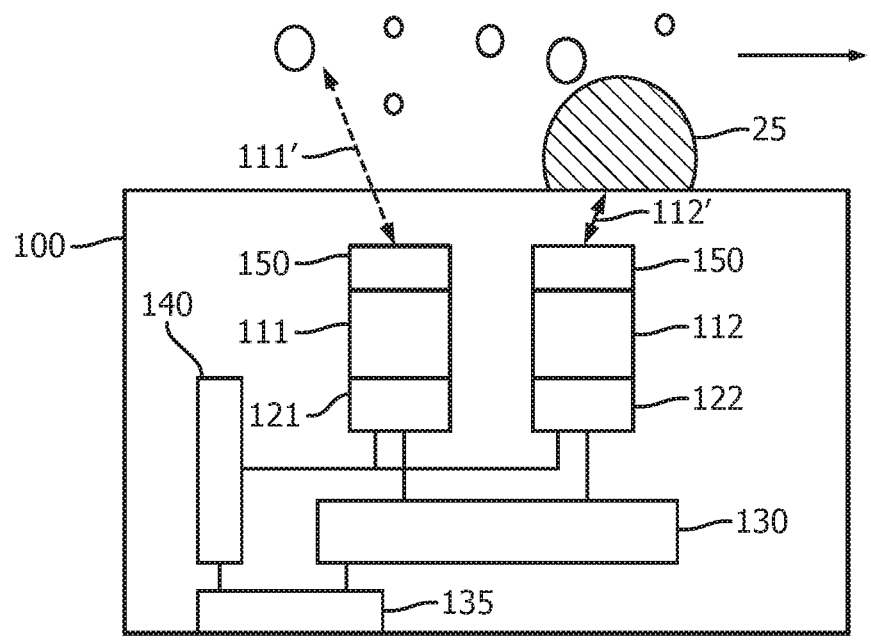
FIG. 16 shows a principal sketch of a third laser sensor module.

FIG. 16 shows a principal sketch of a third laser sensor module. The third laser sensor module 100 includes a first laser 111 and a second laser 112. Both lasers 111, 112 may be VCSEL or side emitters which are arranged to emit laser light in the same direction. An optical arrangement 150 is optically coupled with each laser 111, 112 in order to redirect the respective measurement beam 111', 112' such that both measurement beams 111' and 112' are directed to the different measurement volumes. The optical arrangement 150 includes gratings for deflecting the measurement beams 111', 112' and further optical devices such that the numerical aperture of the measurement beams 111' and 112' is 0.03. First and second interference signals or self-mixing interference signals may be generated after reflecting the first and/or second measurement beam 111', 112' by a particle included by a particle flow parallel to the surface of the second laser sensor module 100. The self-mixing interference signals are detected by the first and/or second detector 121, 122. The detected self-mixing interference signals are received and evaluated by means of an evaluator 140. The lasers 111, 112 are driven by means of electrical driver 130. Electrical measurement results generated by means of the evaluator 140 as well as electrical power may be provided by means of a common interface 135. Alternatively separate interfaces may be used. The first and second self-mixing interference signals are used to determine the second particle density based on the average velocity in accordance with equation 8. The first or the second self-mixing interference signals are in addition used to determine the first particle density based on the average transition time in accordance with equation 4. The measurement results regarding the first particle density and the second particle density are combined in order to improve the overall accuracy by providing a third particle density with a reduced measurement error. Measurement beams 111', 112' may alternatively be directed to have partly overlapping measurement volumes. FIG. 16 further shows an object 25 blocking the second measurement beam 112'. The blocking object is placed on an emission window of the laser sensor module 100. The blocking object is detected by driving the second laser 112 with a modulated drive current (e.g. triangular drive current) during predefined time periods. The evaluator 140 may be arranged to determine that the interference signal or self-mixing interference signal is not related to detection of particles 10 (e.g. long time duration, near distance to object). The evaluator 140 may be arranged to ignore the interference signal or self-mixing interference signal and optionally to generate a corresponding error signal.

Figure 17:
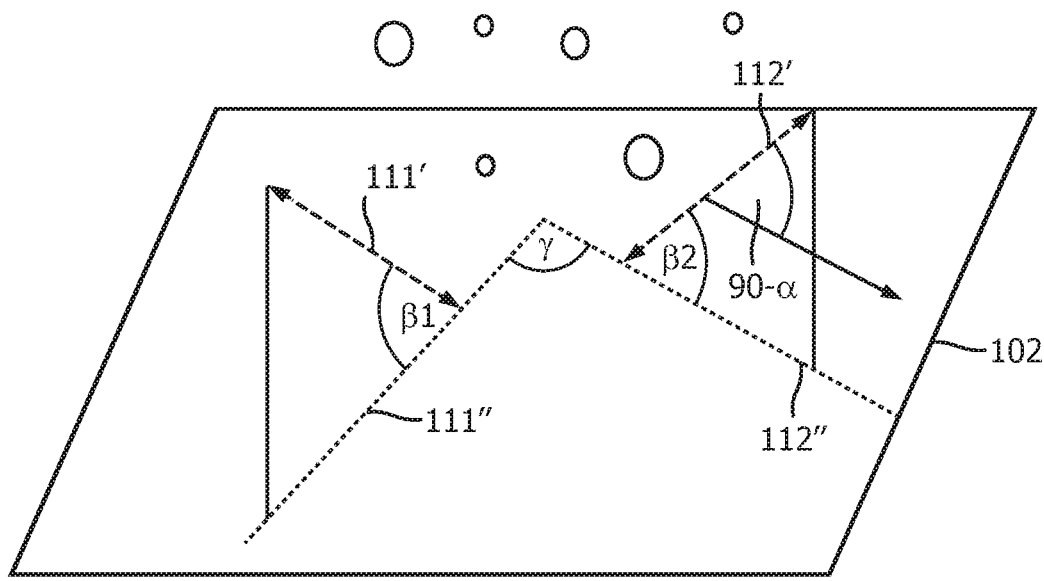
FIG. 17 shows a principal sketch of a perspective view of the measurement beams.

FIG. 17 shows a principal sketch of a perspective view of the first measurement beam 111' and the second measurement beam 112' above a reference surface 102. This configuration may especially be suited for the laser sensor module 100 being arranged to determine particle density of a particle flow parallel to the reference surface 102. The reference surface 102 may be the surface of the laser sensor module 100 or a part of the surface of the device including the laser sensor module 100. The first and the second measurement beam 111', 112' are emitted via the (transparent) reference surface 102 and both measurement beams enclose an angle φ (not shown). The first measurement beam 111' encloses an angle β1 with the reference surface 102 and the second measurement beam 112' encloses an angle β2 with the reference surface 102. A first projection 111" of the first measurement beam 111' on the reference surface 102 and a second protection 112" of the second measurement beam 112' on the reference surface 102 enclose an angle γ. The particle flow parallel to the reference surface 102 is indicated by an arrow enclosing an angle of 90-α with the second measurement beam 112'.

Figure 18:
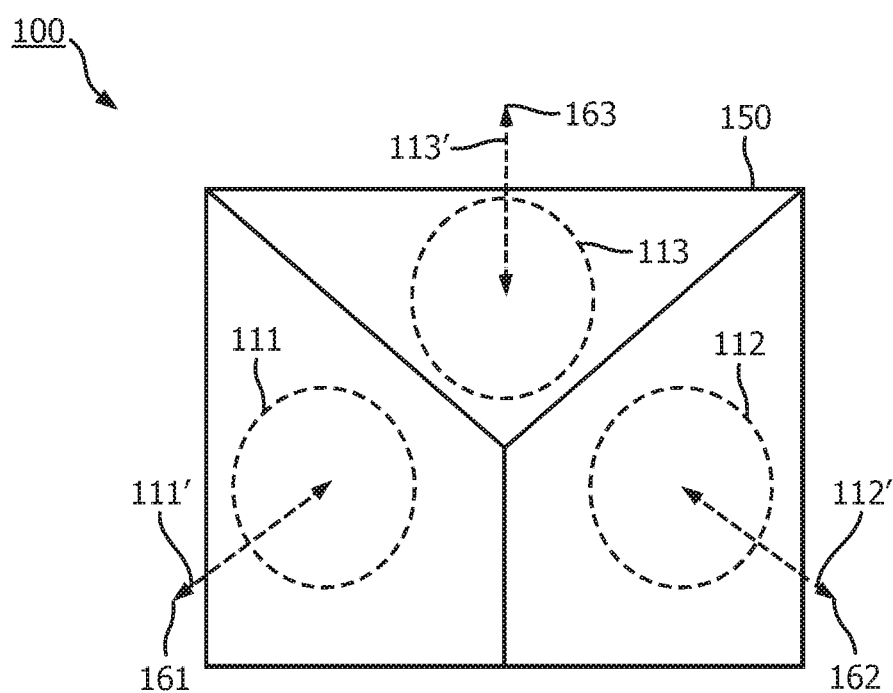
FIG. 18 shows a principal sketch of a top view of a fourth laser sensor module.

FIG. 18 shows a principal sketch of a top view of a fourth laser sensor module 100. Three lasers 111, 112, 113 are arranged to emit measurement beams 111', 112', 113' to different first, second and third measurement volumes 161, 162, 163. An optical arrangement 150 is in this case arranged such that the first measurement beam 111' and the second measurement beam 112' enclose the same angle like the second measurement beam 112' and the third measurement beam 113' and like the third measurement beam 113' and the first measurement beam 111'. The angle enclosed by the measurement beams 111', 112', 113' is preferably 90°. The second laser sensor module 100 is therefore enabled to determine a three-dimensional average velocity. The optical arrangement 150 further includes micro-optical component which are arranged to focus the respective measurement beam 111', 112', 113' with a numerical aperture of 0.025 to the respective measurement volume. The third laser sensor module 100 is arranged to determine a second particle density based on the first, the second, the third self-mixing interference signals by means of a three-dimensional version of equation 8. The third laser sensor module 100 is further arranged to determine a transition time-based first particle density based on self-mixing interference signals provided by one of the sensors (not shown) in accordance with equation 4.

Figure 19:
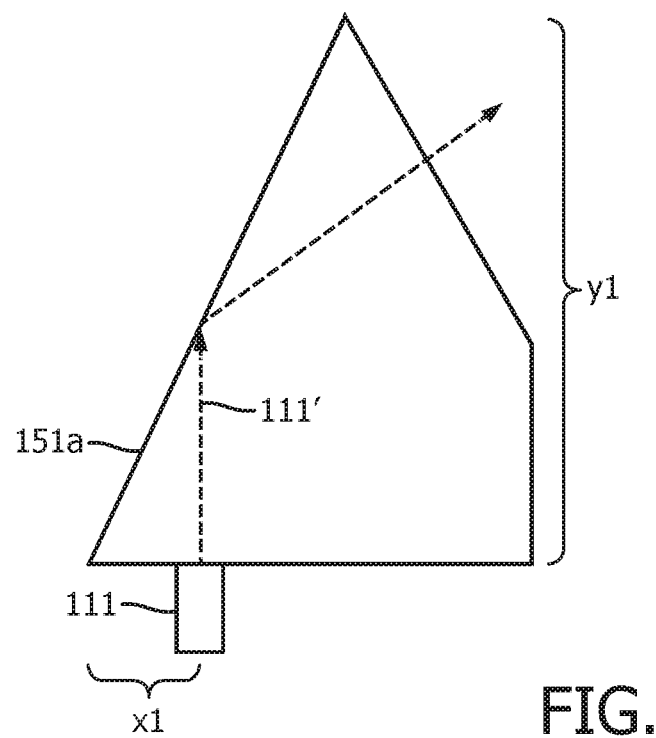
FIG. 19 shows a principal sketch of a first micro-optical component.

FIG. 19 shows a principal sketch of a first micro-optical component 151a which may be included by the optical arrangement 150. The micro-optical component 151a consists of a mirror on wafer level. For instance, 151a can be made of a UV-curing replica material. Also other technologies like glass molding or grinding are possible. The mirror is in this case based on total internal reflection in order to redirect the first measurement been 111'. The distance x1 between the center of the first laser 111 and the edge of the first micro-optical component 151a is x1=0.04 mm. A height of the first micro-optical component 151a is y1=0.20 mm.

Figure 20:
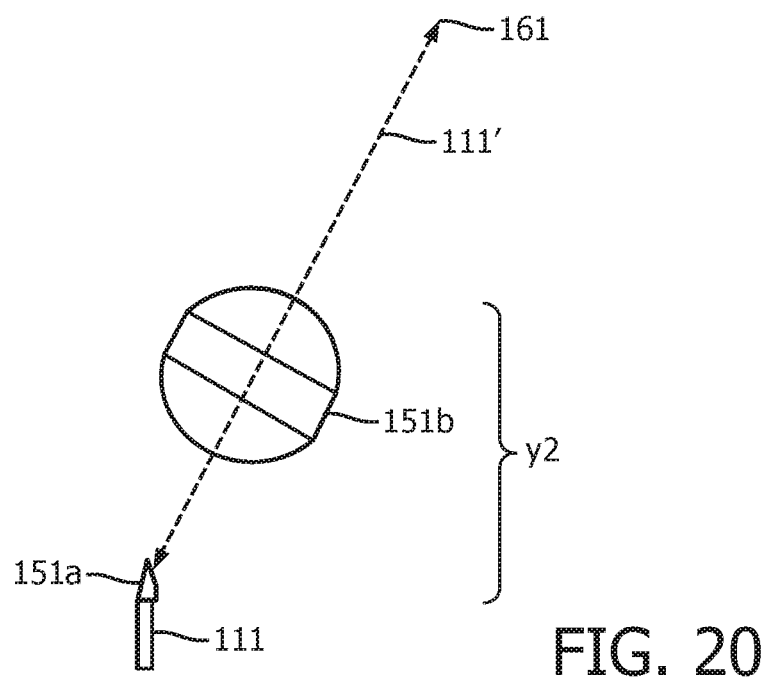
FIG. 20 shows a principal sketch of a first optical arrangement.

FIG. 20 shows a principal sketch of a part of a first optical arrangement 150. The part includes the first micro-optical component 151a and a focusing element 151b. The focusing element 151b is a lens with a size of less than 1 mm and the total height y2 of the part of the optical device is y2=1.1 mm. The lens is arranged to focus the first measurement beam 111' to a first measurement volume 161. Each of the lasers 111, 112, 113 may be assigned to such a part of the first optical device 150. The first micro-optical component 151a and the focusing element 151b are shown as separate elements for clarity reasons. It may be preferred to integrate two or three of such first micro-optical components 151a and two or three of such focusing elements 151b in one integrated optical arrangement 150. It is also possible that one focusing element 151b receives first measurement beams 111' from two, three, four or more first lasers 111 with associated first micro-optical component 151a such that, for example, an array of lasers can be used to emit a bundle of first measurement beams 111'. The focusing element 151b is arranged to focus the first measurement beam 111' with a numerical aperture of 0.03.

Figure 21:
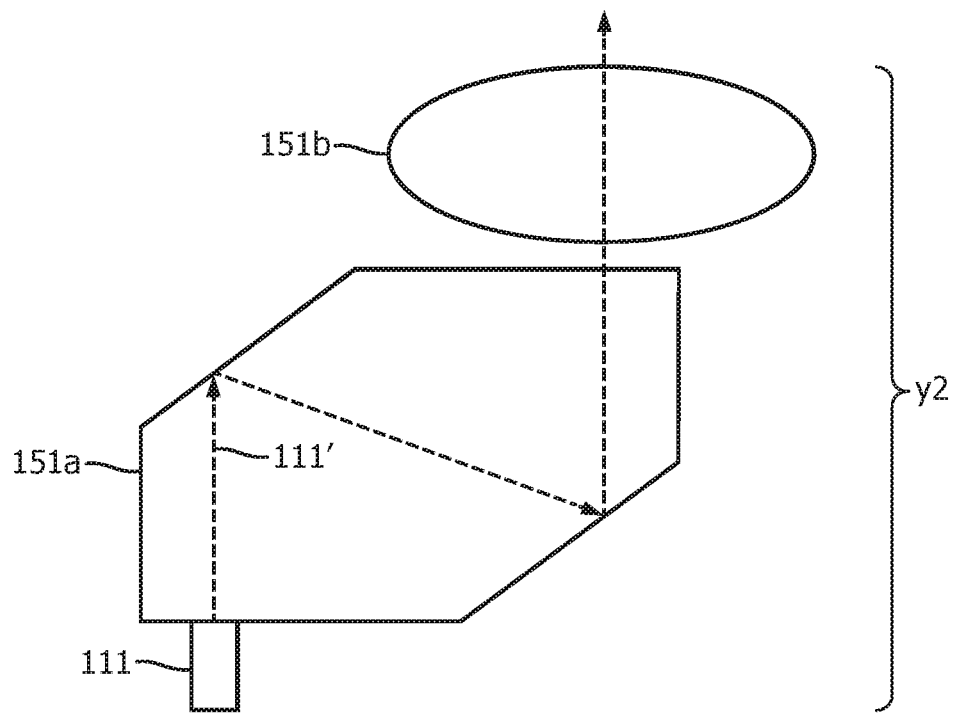
FIG. 21 shows a principal sketch of a second optical arrangement.

FIG. 21 shows a principal sketch of a second optical arrangement 150 including a second micro-optical component 151a and a second focusing element 151b. The second micro-optical component 151a includes two reflective surfaces such that the first measurement beam 111' is folded within the micro-optical component 151a in a Z shape turned 90° counterclockwise. The second focusing element 151b is a lens being arranged to focus the first measurement beam 111' with a numerical aperture of 0.025 to the first measurement volume. The total height (building height) of the second micro-optical component 151a, the second focusing element 151b and the first laser 111 is y2=0.7 mm.

Figure 22:
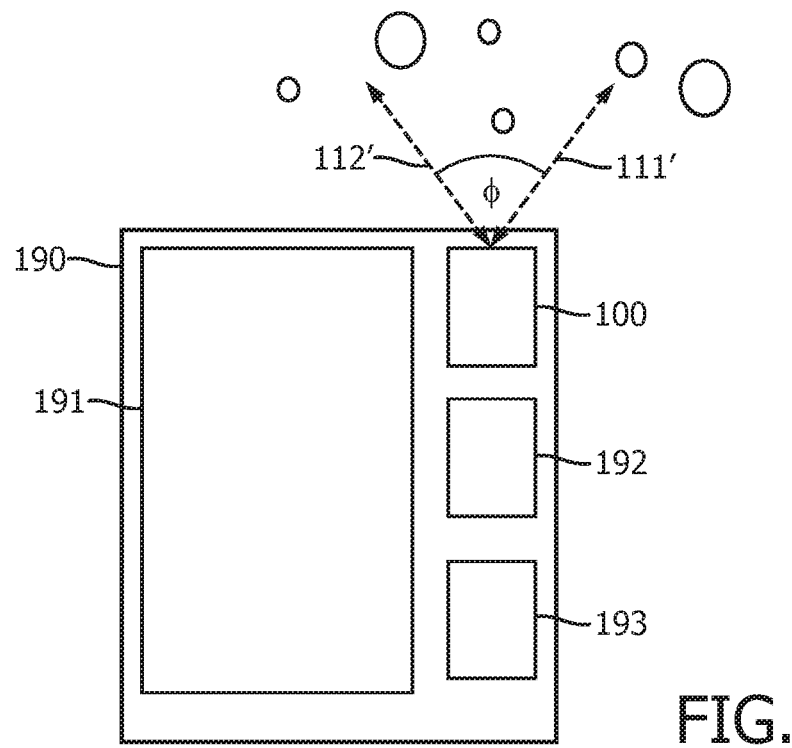
FIG. 22 shows a principal sketch of a mobile communication device.

FIG. 22 shows a principal sketch of a mobile communication device 190 including a laser sensor module 100. The laser sensor module is adapted to emit a first measurement beam 111' and a second measurement beam 112' which enclose an angle φ=60°. The mobile communication device 190 includes a user interface 191, a processing device 192 and a main memory device 193. The main processing device 192 is connected with the main memory device 193 and with the laser sensor module 100. The main processing device 192 includes at least a part of the functionalities of evaluator 140 which are described above. The main processing device 192 stores data related to particle detection in the main memory device 193. In an alternative embodiment it may also be possible that the main processing device 192 and the main memory device 193 are only used to prepare or adapt data provided by means of the laser sensor module 100 such that the data can be presented to a user of the mobile communication device 190 by means of user interface 191. The laser sensor module 100 is powered by means of a power supply of the mobile communication device 190. The mobile communication device 190 may further include an orientation detection device (not shown). The orientation detection device may, for example, be adapted to determine the relative position of the mobile communication device 190 with respect to ground. The orientation detection device may be coupled with evaluator 140 or the main processing device in order to combine the data provided by means of the laser sensor module 100 and data provided by means of the orientation detection device. Coupling of the orientation detection device and the laser sensor module 100 may enable a more reliable detection of wind speed and particle density and may also provide information about wind direction. The laser sensor module 100 may be further arranged to detect an object 25. The object 25 may, for example, be a hand which may be used for gesture control.

The same principle may be used in other devices including the laser sensor module 100. Additional sensors may be used to provide information about the position or a velocity of a device (e.g. a car including the laser sensor module 100). The velocity of the device may be used, for example, to support evaluation of the measurement signals (e.g. determine an adapted reference velocity).

Figure 23:
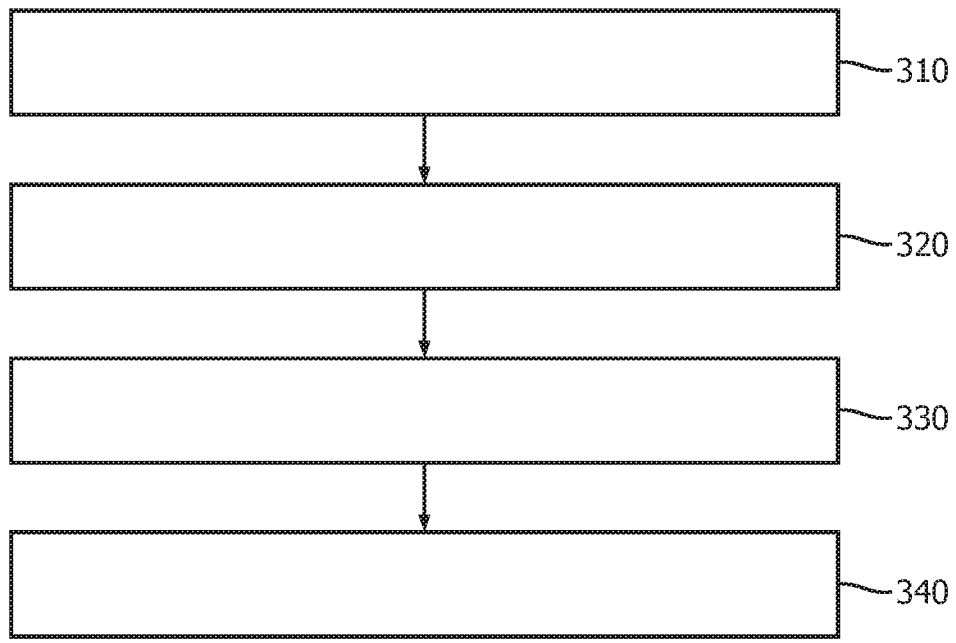
FIG. 23 shows a principal sketch of a first method of determining a first particle density.

FIG. 23 shows a principal sketch of a first method of determining the particle density. In step 310 the angle between the velocity vector of the particle flow and the first measurement beam is determined by means of the average transition time and the Doppler frequency of the self-mixing interference signals (see equation 1). The effective average transition time is determined in step 320 (see equation 3). In step 330 (see equation 2) the sensitivity correction with respect to velocity is determined. The first particle density or PM 2.5 value is determined in step 340 (see equation 4).

Figure 24:
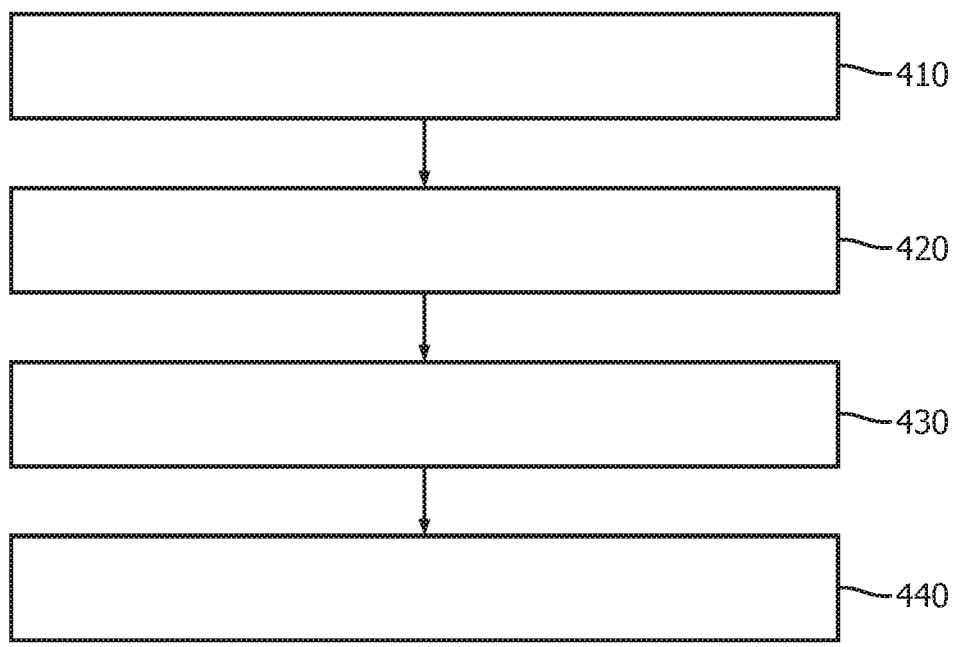
FIG. 24 shows a principal sketch of a first method of determining a second particle density.

FIG. 24 shows a principal sketch of a second method of determining the particle density. In step 410 the velocity values are determined from frequency values determined by means of the self-mixing interference signals (see equation 5). In step 420 the average particle velocities are determined (see equation 6). The relative likelihood for detection is determined in step 430 (see equation 7) especially in case of a laser sensor module 100 with an optical arrangement 150 being characterized by a small numerical aperture (e.g. 0.03). The particle density or PM 2.5 value is determined in step 440 (see equation 8).

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Any reference signs in the claims should not be construed as limiting the scope thereof.

The following is a list of reference numerals used herein:
5 number of particles/m³ per 0.1 µm bin
10 particle size [µm]
11 flat
12 typical airborne particle distribution
13 incense
14 Shanghai smog
20 particle counts/(minute*µg/m³)
21 0.05 m/s
22 0.6 m/s
23 7 m/s
25 object
30 particle velocity [m/s]
31 derived PM 2.5 value at 0.05 m/s
32 derived PM 2.5 value at 0.6 m/s
33 derived PM 2.5 value at 7 m/s
35 derived PM 2.5 value µg/m³ per 0.1 µm bin
41 self-mixing interference signal strength in arbitrary units
42 time [µs]
45 received particle signal measurement beam perpendicular to particle flow
46 received particle signal measurement beam tilted to particle flow
48 measurement result
50 particle counts at different signal-to-noise ratio threshold levels
51 ratio of particle counts at 0.05 m/s
52 ratio of particle counts at 0.6 m/s
53 ratio of particle counts at 7 m/s
61 detection distance [m]
62 numerical aperture
63 minimum particle size [µm]
65 detection distance as a function of numerical aperture minimum detected particle size as a function of numerical aperture@0.02 m/s
67 minimum detected particle size as a function of numerical aperture@6 m/s
100 laser sensor module
102 reference surface
111 first laser
111' first measurement beam
111" first projection of first measurement beam
112 second laser
112' second measurement beam
112" second projection of second measurement beam
113 third laser
113' third measurement beam
121 first detector
122 second detector
130 electrical driver
135 interface
140 evaluator
150 optical arrangement
151a micro-optical component
151b focusing element
152 beam splitter
153 quarter wavelength plate
155 optical filter device
157 focusing device
161 first measurement volume
162 second measurement volume
163 third measurement volume
190 mobile communication device
191 user interface
192 main processing device
193 main memory device
310 determine angle
320 determine sensitivity correction
330 determine effective average transition time
340 determine first particle density
410 determine velocity values
420 determine average particle velocity
430 determine relative likelihood for detection
440 determine second particle density
90-α angle enclosed between measurement beams and particle flow
β1 angle enclosed between first measurement beam and first projection
β2 angle enclosed between second measurement beam and second projection
γ angle enclosed between the first projection and the second projection on the reference surface

The invention claimed is:

1. A laser sensor for detecting a particle density, the laser sensor comprising:
at least a first laser configured to emit a first light or laser beam,
an optical arrangement being arranged to focus at least the first light or laser beam to a first measurement volume, wherein the optical arrangement has a first numerical aperture with respect to the first light or laser beam,
at least a first detector configured to receive a first self-mixing interference signal of a first optical wave within a first laser cavity of the first laser, and
an evaluator, wherein the evaluator is configured to receive detection signals generated by at least the first detector in reaction to the first self-mixing interference signal, the evaluator is further configured to determine an average transition time of particles passing the first measurement volume in a predetermined time period based on a duration of the first self-mixing interference signals generated by the particles, the evaluator is further configured to determine a number of particles based on the first self-mixing interference signals in the predetermined time period, and the evaluator is further configured to determine a first particle density based on the average transition time and the number of particles.

2. The laser sensor according to claim 1,
Wherein the laser sensor is for detecting the particle density of small particles that have a particle size of less than 20 µm,
wherein the evaluator is further configured to determine an angle enclosed between the first light or laser beam and a velocity vector of the particles based on the first self-mixing interference signal and the average transition time,
Wherein the numerical aperture is arranged to detect a predetermined minimum particle size at a reference velocity,
wherein the reference velocity is within a predetermined velocity range between 0.01 m/s and 7 m/s comprising the reference velocity,
wherein the first particle density is further determined based on the reference velocity and a reference beam diameter of the first measurement light or laser beam, wherein the reference velocity and the reference beam diameter define a reference time in which a reference particle with a reference particle size passes the first light or laser beam, and wherein a velocity vector of the reference particle is perpendicular to the first measurement light or laser beam.

3. The laser sensor according to claim 2, wherein the laser sensor comprises:

at least a second laser configured to emit a second light or laser beam; and at least a second detector configured to receive a second self-mixing interference signal of a second optical wave within a second laser cavity of the second laser, wherein the optical arrangement is further arranged to focus at least the second light or laser beam to a second measurement volume, wherein the optical arrangement has a second numerical aperture with respect to the second light or laser beam, wherein the second numerical aperture is arranged to detect a predetermined minimum particle size at the reference velocity, and wherein the first light or laser beam and the second light or laser beam mutually enclose an angle between 10° and 160°, and wherein the evaluator is further configured to receive detection signals generated by the second detector in reaction to the second self-mixing interference signals, wherein the evaluator is further configured to determine at least a first average velocity of particles detected by the first detector and at least a second average velocity of particles detected by the second detector via the detection signals received in the predetermined time period, wherein the evaluator is further configured to determine a second number of particles based on the detected signals provided by the second detector in the predetermined time period, wherein the evaluator is further configured to determine a second particle density based on an average particle velocity determined at least via the first average velocity and the second average velocity, at least the first number of particles and at least the second number of particles, and wherein the evaluator is further configured to determine as third particle density based on the first particle density and the second particle density.

4. The laser sensor according to claim 3, wherein the first light or laser beam encloses a first angle β1 with a reference surface, wherein the second light or laser beam encloses a second angle β2 with the reference surface, and wherein a projection of the first light or laser beam on the reference surface and a projection of the second measurement beam on the reference surface encloses an angle γ between 20° and 160.

5. The laser sensor according to claim 3, wherein the evaluator is further configured to correct the determined second particle density by a factor comprising the cube root of the ratio between the reference velocity and the determined average particle velocity.

6. The laser sensor according to claim 3, wherein the first measurement volume is linearly extended in the direction of the first light or laser beam, wherein the second measurement volume is linearly extended in the direction of the second light or laser beam, wherein the evaluator is configured to determine a first relative likelihood for detection of particles in the first measurement volume, wherein the evaluator is configured to determine a second relative likelihood for detection of particles in the second measurement volume, and wherein the evaluator is further configured to correct the determined second particle density via the first relative likelihood and the second relative likelihood.

7. The laser sensor according to claim 1, wherein the optical arrangement has a numerical aperture between 0.01 and 0.06, with respect to the first light or laser beam.

8. The laser sensor according to claim 1, wherein the evaluator is further configured to correct the determined first particle density by a factor comprising the fourth root of the ratio between the average transition time and a reference time.

9. The laser sensor according to claim 1, wherein the evaluator is further configured to determine a first particle count rate at a first signal to noise ratio threshold level and a second particle count rate at a second signal to noise ratio threshold level different than the first signal to noise ratio threshold level, and wherein the evaluator is further configured to correct the determined first particle density based on the first particle count rate and the second particle count rate.

10. The laser sensor according claim 1, wherein the laser sensor comprises an exit window through which the first light or laser beam is emitted to the first measurement volume, wherein the optical arrangement is arranged to fold the first light or laser beam such that a building height of the first laser and the optical arrangement perpendicular to the exit window of the laser sensor is smaller than 1 mm.

11. The laser sensor according to claim 1, wherein the laser sensor is arranged to detect the particle density in a first mode, and wherein the laser sensor is arranged to detect a proximity of an object with the size of at least 1 mm in a second mode.

12. A mobile communication device comprising the laser sensor according to claim 1, wherein the mobile communication device is configured to present measurement results provided by the laser sensor.

13. A laser sensor for detecting a particle density, the laser sensor comprising:

at least a first laser configured to emit a first light or laser beam, an optical arrangement arranged to focus at least the first light or laser beam to a first measurement volume, wherein the optical arrangement has a first numerical aperture with respect to the first light or laser beam, at least a first detector configured to determine a first interference signal, and an evaluator, wherein the evaluator is configured to receive detection signals generated by at least the first detector in reaction to the determined first interference signal, wherein the evaluator is further configured to determine an average transition time of particles passing the first measurement volume in a predetermined time period based on a duration of the first interference signals generated by the particles, wherein the evaluator is further configured to determine a number of particles based on the first interference signals in the predetermined time period, and wherein the evaluator is further configured to determine a first particle density based on the average transition time and the number of particles.

14. A method of particle detection, the method comprising:
- emitting at least a first light or laser beam by a first laser,
- focusing the first light or laser beam with a first numerical aperture,
- determining a first interference signal or a first self-mixing interference signal of a first optical wave within a first laser cavity of the first laser,
- determining an average transition time of particles passing the first measurement volume in a predetermined time period based on a duration of the first interference signal or the first self-mixing interference signals generated by the particles,
- determining a number of particles based on the first interference signal or the first self-mixing interference signals in the predetermined time period, and
- determining a first particle density based on the average transition time and the number of particles.

15. A non-transitory computer readable medium comprising computer readable code, wherein the computer readable code provides instructions such that the method of particle detection according to claim 14 can be executed by at least one processing device comprised in a laser sensor or by at least one processing device of the device comprising the laser sensor.

* * * * *